US007359427B2

(12) United States Patent
Kanterakis et al.

(10) Patent No.: US 7,359,427 B2
(45) Date of Patent: Apr. 15, 2008

(54) RACH RAMP-UP ACKNOWLEDGEMENT

(75) Inventors: Emmanuel Kanterakis, North Brunswick, NJ (US); Kourosh Parsa, Riverside, CT (US)

(73) Assignee: Golden Bridge Technology, Inc., West Long Branch, NJ (US)

( * ) Notice: Subject to any disclaimer, the term of this patent is extended or adjusted under 35 U.S.C. 154(b) by 139 days.

(21) Appl. No.: 10/412,576

(22) Filed: Apr. 14, 2003

(65) Prior Publication Data

US 2003/0223476 A1    Dec. 4, 2003

Related U.S. Application Data

(63) Continuation of application No. 09/273,450, filed on Mar. 22, 1999, now Pat. No. 6,574,267.

(51) Int. Cl.
*H04B 1/00* (2006.01)
*H04B 1/216* (2006.01)

(52) U.S. Cl. .................................. 375/141; 370/335
(58) Field of Classification Search ........ 375/362–368, 375/144–148, 130, 140, 141, 377, 259, 143, 375/149, 152; 370/328, 335, 342, 345, 347, 370/442, 445, 218, 525–529, 503, 278, 441; 455/515, 450, 516, 509, 517, 513, 500
See application file for complete search history.

(56) References Cited

U.S. PATENT DOCUMENTS 4,689,786 A    8/1987    Sidhu et al.

(Continued)

FOREIGN PATENT DOCUMENTS

EP    0 731 578    9/1996

(Continued)

OTHER PUBLICATIONS

Kourosh "Common Packet Channel (CPCH): The optimum wireless Internet mechanism is W-CDMA," IEE 2000, pp 148-155.*

(Continued)

*Primary Examiner*—Tesfaldet Bocure
(74) *Attorney, Agent, or Firm*—McDermott Will & Emery LLP

(57) ABSTRACT

An improvement to a code-division-multiple-access (CDMA) system employing spread-spectrum modulation, with the CDMA system having a base station (BS) and a plurality of remote stations. The base station has a BS-spread-spectrum transmitter and a BS-spread-spectrum receiver. A remote station has an RS-spread-spectrum transmitter and an RS-spread-spectrum receiver. The BS transmitter transmits a broadcast common-synchronization channel, which includes a frame-timing signal. The broadcast common-synchronization channel has a common chip-sequence signal, which is common to the plurality of remote stations. In response to the RS-spread-spectrum receiver receiving the broadcast common-synchronization channel, and determining frame timing from the frame-timing signal, an RS-spread-spectrum transmitter transmits an access-burst signal. The access-burst signal includes a collision-detection portion. In response to the BS-spread-spectrum receiver receiving the access-burst signal, the BS-spread-spectrum transmitter transmits an collision-detection signal with the collision detection portion. In response to the BS-spread-spectrum receiver not receiving the access-burst signal due to a collision with a collision access-burst signal, the BS-spread-spectrum transmitter transmits an collision-detection signal without the correct collision detection portion.

38 Claims, 11 Drawing Sheets

U.S. PATENT DOCUMENTS

| | | | |
|---|---|---|---|
| 5,280,472 A | 1/1994 | Gilhousen et al. | |
| 5,295,152 A * | 3/1994 | Gudmundson et al. | 370/342 |
| 5,305,308 A | 4/1994 | English et al. | |
| 5,329,550 A | 7/1994 | Rousseau et al. | |
| 5,430,760 A | 7/1995 | Dent | |
| 5,461,639 A | 10/1995 | Wheatley, III et al. | |
| 5,491,837 A | 2/1996 | Haartsen | |
| 5,535,210 A | 7/1996 | Smolinske et al. | |
| 5,537,397 A | 7/1996 | Abramson | |
| 5,544,196 A | 8/1996 | Tiedemann, Jr. et al. | |
| 5,553,210 A | 9/1996 | Narayanaswami | |
| 5,752,172 A | 5/1998 | Matero | |
| 5,806,003 A | 9/1998 | Jolma et al. | |
| 5,809,430 A | 9/1998 | D'Amico | |
| 5,822,311 A | 10/1998 | Hassan et al. | |
| 5,828,662 A | 10/1998 | Jalali et al. | |
| 5,841,768 A | 11/1998 | Ozluturk et al. | |
| 5,850,392 A | 12/1998 | Wang et al. | |
| 5,933,777 A | 8/1999 | Rahman | |
| 5,953,369 A | 9/1999 | Suzuki | |
| 5,982,763 A | 11/1999 | Sato | |
| 5,991,308 A | 11/1999 | Fuhrmann et al. | |
| 6,009,089 A | 12/1999 | Huang et al. | |
| 6,011,788 A | 1/2000 | Hurst et al. | |
| 6,021,122 A * | 2/2000 | Tiedemann, Jr. | 370/331 |
| 6,026,081 A | 2/2000 | Hamabe | |
| 6,038,250 A | 3/2000 | Shou et al. | |
| 6,091,757 A | 7/2000 | Cudak et al. | |
| 6,094,576 A | 7/2000 | Hakkinen et al. | |
| 6,141,337 A | 10/2000 | Uta et al. | |
| 6,141,373 A | 10/2000 | Scott | |
| 6,144,841 A | 11/2000 | Feeney | |
| 6,163,533 A | 12/2000 | Esmailzadeh et al. | |
| 6,169,759 B1 | 1/2001 | Kanterakis et al. | |
| 6,181,683 B1 | 1/2001 | Chevillat et al. | |
| 6,181,949 B1 | 1/2001 | Ozluturk et al. | |
| 6,256,301 B1 | 7/2001 | Tiedemann, Jr. et al. | |
| 6,259,724 B1 | 7/2001 | Esmailzadeh | |
| 6,301,286 B1 | 10/2001 | Kanterakis et al. | |
| 6,381,229 B1 | 4/2002 | Narvinger et al. | |
| 6,442,153 B1 | 8/2002 | Dahlman et al. | |
| 6,535,736 B1 * | 3/2003 | Balogh et al. | 455/434 |
| 6,574,267 B1 | 6/2003 | Kanterakis et al. | |
| 6,587,672 B1 | 7/2003 | Chuah et al. | |
| 6,597,675 B1 | 7/2003 | Esmailzadeh et al. | |
| 6,606,313 B1 | 8/2003 | Dahlman et al. | |
| 6,615,050 B1 | 9/2003 | Tiedemann, Jr. et al. | |
| 6,757,293 B1 * | 6/2004 | Chuah et al. | 370/432 |
| 6,775,548 B1 * | 8/2004 | Rong et al. | 370/468 |
| 6,992,998 B1 * | 1/2006 | Bhatoolaul et al. | 370/329 |
| 7,076,262 B1 * | 7/2006 | Bhatoolaul et al. | 455/522 |
| 2003/0114113 A1 * | 6/2003 | Kornprobsf | 455/69 |

FOREIGN PATENT DOCUMENTS

| | | |
|---|---|---|
| EP | 0 773 636 | 5/1997 |
| GB | 2 318 256 | 4/1998 |
| JP | 2-256331 | 10/1990 |
| JP | 9233051 | 5/1997 |
| WO | WO93/18601 | 9/1993 |
| WO | WO97/00568 | 1/1997 |
| WO | WO 97/29596 | 8/1997 |
| WO | WO97/46041 | 12/1997 |
| WO | WO 00/14989 * | 3/2000 |

OTHER PUBLICATIONS

Dong In Kim et al., "Random Assignment/Transmitter Oriented Code Scheme for Centralized DS/SSMA Packet Radio Networks," IEEE Journal on Selected Area in Communication, vol. 14, No. 8, Oct. 1996, pp. 1560-1568.

Riaz Esmailzadeh et al. "A New Slotted ALOHA Based Random Access Method for CDMA Systems," IEEE, ICUPC 1997, pp. 43-47.

Modification of the current RACH scheme for increased throughput, ETSI SMG2 UMTS L1 Expert Group, Meeting #7. Stockholm, Sweden, Oct. 14-16, 1998, pp. 1-5.

"Mobile Station-Base Station Compatibility Standard for Dual-Mode Wideband Spread Spectrum Cellular Systems", Telecommunications Industry Association (TIA)/Electronic Industry Association (EIA) Interim Standard 95-A, May 1995, TIA/EIA/IS-95-A.

"Performance Evaluation of Different Random-Access Power-Ramping Schemes," Ericsson, SMG2 UMTS-L1 670/98, Dec. 14-18, 1998, Tdoc SMG2 UMTS-L1 670/98.

"UTRA Physical Layer Description FDD parts", Editor of UTRA/FDD physical layer description, May 18-20, 1998, v0.2 May, 19, 1998, Tdoc SMG2 UMTS-L1 56/98.

"Power Ramping for RACH Burst Transmission", Lucent Technologies Inc., Jun. 23-26, 1998, Tdoc SMG2 UMTS-L23 135/98.

"Power Ramping RACH Transmission for UTRAN", Lucent Technologies, Inc., Sep. 1-4, 1998, Tdoc SMG2 UMTS-L23 161/98.

"AiSMA (Acquired Indictaion Sense Multiple Access) for RACH Scheme", TTA, Nov. 9-12, 1998, Tdoc SMG2 UMTS-L1 504/98.

"Modification to RACH Scheme", Philips Consumer Communications/Philips Research Laboratories, Nov. 9-12, 1998, Tdoc SMG2 UmTS-L1 533/98.

"Comparisons of Power Ramping Schemes for RACH", Motorola, Oct./Nov. 1998, Tdoc SMG2 UMTS-L1 564/98.

"AiSMA With FAst Power Ramping for PRACH Scheme", TTA, Dec. 14-18, 1998, Tdoc SMG2 UMTS-L1 629/98.

"The ETSI UMTS Terrestrial Radio Access (UTRA) ITU-R RTT Canidate Submission", SMG2, May/Jun. 1998, "Submission of Proposed Radio Transmission Technologies".

"Ericsson Comments on the GBT Convergence Proposal for WP-CDMA", T1P1.5/98-528 TR46.1.98.10.27.07.

"A Proposal for Access Channel Structure and Procedures", TIA-TR45.5.3, Dec. 14-18, 1998, Tdoc SMG2 UMTS-L1 660/98.

"Report on the Random Access AD Hoc Meeting", ETSI, Dec. 1998, Tdoc SMG2 UMTS-L1 760/98.

"Ericsson WP-CDMA Proposal", Stephen Hays, Oct. 27, 1998, T1P1.5/98-527 TR46.1.98.10.27.06.

"Mobile Station-Base Station Compatibility Standard for Wideband Spread Spectrum Cellular Systems", Telecommuncations Industry Association, Approved: Feb. 3, 1999; Reaffirmed: Sep. 9, 2004, TIA-95-B (Reaffirmation of TIA/EIA-95-B).

Defendant's Preliminary Invalidity Contentions, GBTI v. Nokia, Inc. and Lucent Technologies Inc., Civil Action No. 2-05CV0151-LED.

Defendant's Amended Preliminary Invalidity Contentions, GBTI v. Nokia, Inc. and Lucent Technologies Inc., Civil Action No. 2-05CVD151-LED.

Request for Ex Parte Reexamination of U.S. Patent No. 6,574,267, Oct. 20, 2005.

"Submission of Patent Owner Admissions in Ex Parte Reexamination of U.S. Patent No. 6,574,267 Puruant to 37 CFR 1.104(c)(3)" submitted in Reexamination No. 90/007,767.

"Defendant's Motion ad Brief in Support of Summary Judgment of Noninfringement or, in the alternative, invalidity", Golden Bridge Technology, Inc. v. Nokia Inc and Lucent Technologies Inc, U.S. D.Ct., E. D. Texas, Marshall Division, Civil Action No. 2-05CV-151-LED.

"Expert Report of Dr. Toby Berger on the Invalidity of the '267 Patent∝(without exhibits)", Golden Bridge Technology, Inc. v. Nokia Inc and Lucent Technologies Inc, U.S.D.Ct., E.D. Texas, Marshall Division, Civil Action No. 2-05CV-151-LED.

Parsa, K., "Preamble Architecture of Closed Loop Power Control of Isolated Packets in the UL Direction,", TIA Committee TR 46.1 Contribution, Aug. 18, 1998.

Parsa, K, "Common Packet Channel," TIA Committee TR 46.1 Contribution, Sep. 14, 1998.

Parsa, K., "Issues surrounding the Close Loop Power Control (CLPC) in CPCH and RACH(II), " WP-DCMA Committee Contribution, Oct. 7, 1998.

Ericsson, "Modification of the current RACH scheme for increased throughput," ETSI SMG UMTS L1 Expert Group, Tdoc SMG2, GMTS-L1 455/98, Oct. 14-16, 1998.

"Ericsson comments on the GBT Convergence Proposal for WP-CDMA," Andreasson, H. et al., Oct. 22, 1998.

InterDigital Communications Corporation, "Harmonization Report of the Wideband Packet Code Division of Multiple Access (WP-CDMA) Committee," Editor, Gill LaVean, T1P1.5/98-553, TR46. 1.1/98.10.29.17, Oct. 29, 1998.

Claim Construction Order, Golden Bridge Technology, Inc v. Nokia Inc and Lucent Technologies Inc, U.S.D.Ct., Texas, Marshall Division, Civil Action No. 2-05CV-151-LED.

Track Changes of amendments to unidentified patent specifications cited as Exhibit 26 attached to Exhibit 2 of "Submissions of Patent Owner Admissions in Ex Parte Reexamination of U.S. Patent No. 6,574,267 Pursuant to 37 CFR 1.104(c)(3)" submitted in Reexamination No. 90/007,767.

Claim comparison chart of Tdoc SMG2 UMTS-L1 455/98 document to claims of U.S. Patent No. 6,574,267, Golden Bridge Technology, Inc. V. Nokia Inc and Lucent Technologies Inc, U.S. D.C.t., E.D. Texas, Marshall Division, Civil Action No. 2-05CV-151-LED.

Claim comparison chart of Dahiman (U.S. Patent No. 6,606,313) to claims of U.S. Patent No. 6,574,267, Golden Bridge Technology, Inc. v. Nokia Inc and Lucent Technologies Inc, U.S.D.Ct., E.D. Texas, Marshall Division, Civil Action No. 2-05CV-151-LEd.

"Plaintiff's Opposition to Defendants' Motion and Brief in Support of Summary Judgment of Non-Infringement or, in the alternative Invalidity," Golden Bridge Technology, Inc. v. Nokia Inc and Lucent Technologies inc, U.S.D.Ct., E.D. Texas, Marshall Division, Civil Action No. 2-05CV-151-LED.

Declaration of Emmanuel Kanterakis, Golden Bridge Technology, Inc. v. Nokia Inc and Lucent Technologies inc, U.S.D.Ct., E.D. Texas, Marshall Division, Civil Action No. 2-05CV-151-Led.

"Defendants' Reply Brief in Support of Summary Judgment of Noninfringement or, in the Alternative, Invalidity", Golden bridge Technology, Inc. v. Nokia Inc and Lucent Technologies Inc, U.S. D.Ct., E.D. Texas, Marshall Division, Civil Action No. 2-05CV-151-LED.

"Defendants' Reply Brief in Support of Summary Judgment of Invalidity of United States Patent No. 6,574,367 in view of the Häkkinen Publication and the IS-95A Standard", Golden Bridge Technology, Inc. v. Nokia and Lucent Technologies Inc. U.S.D.Ct., E.D. Texas, Marshall Division, Civil Action No. 2-05CV-151-LED.

Claim comparison chart of Häkkinen (WO 97/46041) to claims of U.S. Patent No. 6,574,267," Golden Bridge Technology, Inc. v. Nokia and Lucent Technologies Inc. U.S.D.Ct., E.D. Texas, Marshall Division, Civil Action No. 2-05CV-151-LED.

Claim comparison chart of the IS-95A Standard to claims of the U.S. Patent No. 6,574,267, Golden Bridge Technology, Inc. v. Nokia and Lucent Technologies Inc. U.S.D.Ct., E.D. Texas, Marshall Division, Civil Action No. 2-05CV-151-LED.

"Plantiff's Opposition to Defendants' Motion for Summary Judgment of Invalidity of the United States Patent No 6,574,267 in view of the Häkkinen Publication and the IS-95 A Standard", Golden Bridge Technology, Inc. v. Nokia and Lucent Technologies Inc. U.S.D.Ct., E.D. Texas, Marshall Division, Civil Action No. 2-05CV-151-LED.

"Defendants' Reply to the Opposition to Defendants' Motion for Summary Judgement of Invalidity of Patent No. 6,574,267 in view of the Häkkinen Publication and the IS-95 A Standard", Golden Bridge Technology, Inc. v. Nokia and Lucent Technologies Inc. U.S.D.Ct., E.D. Texas, Marshall Division, Civil Action No. 2-05CV-151-LED.

"UTRA Physical Layer Description FDD parts," Editor of UTR/FDD physical layer description, v0.4, Jun. 25, 1998, Tdoc SMG2 UMTS-L1 221/98, Jun. 15-17, 1998.

Deposition of Donald Schilling, PH.D vol. I and II (videotaped), Monday 18., 2006, Golden Bridge Technology, Inc. v. Nokia and Lucent Technologies Inc. U.S.D.Ct., E.D. Texas, Marshall Division, Civil Action No. 2-05CV-151-LED., (video tape not supplied).

Report and Recommendation of United States Magistrate Judge, Golden Bridge Technology, Inc. v. Nokia and Lucent Technologies Inc. U.S.D.Ct., E.D. Texas, Marshall Division, Civil Action No. 2-05CV-151-LED.

Plaintiff Golden Bridge Technology, Inc's Objections to Report and Recommendation of United States Magistrate Judge, Golden Bridge Technology, Inc. v. Nokia and Lucent Technologies Inc. U.S.D.Ct., E.D. Texas, Marshall Division, Civil Action No. 2-05CV-151-LED.

Second Request For Ex Parte Reexamination of U.S. Patent No. 6,574,267, Oct. 19, 2006.

Complaint. Golden Bridge Technology, Inc. v. Nokia and Lucent Technologies Inc. U.S.D.Ct., E.D. Texas, Marshall Division, Civil Action No. 2-05CV-151-LED.

Answer, Affirmative Defenses and Counterclaims to First Amended Complaint, Golden Bridge Technology, Inc. v. Nokia and Lucent Technologies Inc. U.S.D.Ct., E.D. Texas, Marshall Division, Civil Action No. 2-05CV-151-LED.

Exerpts "Patentability" U.S. Appl. No. 09/237,450. pp. 5, 6, 9-13.

Deposition of Emmanuel Kanterakis, (videotaped), Jun. 1, 2006. Golden Bridge Technology, Inc. v. Nokia and Lucent Technologies Inc. U.S.D.Ct., E.D. Texas, Marshall Division, Civil Action No. 2-05CV-151-LED, (video tape not supplied).

Countinued Videotaped Deposition of Kourosh Parsa, Jul. 29, 2006. Golden Bridge Technology, Inc. v. Nokia and Lucent Technologies Inc. U.S.D.Ct., E.D. Texas, Marshall Division, Civil Action No. 2-05CV-151-LED, (video tape not supplied).

Videotaped Deposition of Kourosh Parsa, Jan. 23, 2006, Golden Bridge Technology, Inc. v. Nokia and Lucent Technologies Inc. U.S.D.Ct., E.D. Texas, Marshall Division, Civil Action No. 2-05CV-151-LED, (video tape not supplied).

Continued Videotaped Deposition of Kourosh Parsa, Jul. 29, 2006, Golden Bridge Technology, Inc. v. Nokia and Lucent Technologies Inc. U.S.D.Ct., E.D. Texas, Marshall Division, Civil Action No. 2-05CV-151-LED, (video tape not supplied).

Curriculum Vitae of Toby Berger.

Exhibit 2: Toby Berger's Referred Publications, 1996-2006.

Exhibit 3: Toby Berger's Lectures and Conference Presentations 1996-2006.

Exhibit 4: Toby Berger's Patents and Patent Applications.

Exhibit 5-Materials Reviewed.

Rach-ramp-up acknowledgement.

United States Patent Application of Emmanuel Kanterakis and Kourosh Parsa for Collision Detection.

"Order Adopting Report and Recommendation of United States Magistrate Judge", Golden Bridge Technology, Inc. v. Nokia and Lucent Technologies Inc. U.S.D.Ct., E.D. Texas, Marshall Division, Civil Action No. 2-05CV-151-LED.

"Rebuttal Report of Donald L. Schilling", Golden Bridge Technology, Inc. v. Nokia Inc and Lucent Technologies Inc, U.S.D.Ct., E.D. Texas Marshall Division, Civil Action No. 2-05CV-151-LED.

'267 Invalidity Chart-567/98, Golden Bridge Technology, Inc. v. Nokia Inc and Lucent Technologies Inc, U.S.D.Ct., E.D. Texas Marshall Division, Civil Action No. 2-05CV-151-LED.

'267 Invaladity Chart- "Performance Evaluation of Different Random-Access Power-Ramping Schemes", Golden Bridge Technology, Inc. v. Nokia Inc and Lucent Technologies Inc, U.S.D.Ct., E.D. Texas Marshall Division, Civil Action No. 2-05CV-151-LED.

'267 Inavalidity Chart-"A Proposal for Access Channel Structure and Procedures", Golden Bridge Technology, Inc. v. Nokia Inc and Lucent Technologies Inc, U.S.D.Ct., E.D. Texas Marshall Division, Civil Action No. 2-05CV-151-LED.

'267 Invalidity Chart-TDoc SMCG2 UMTS-Li 533/98 ("533/98"), Golden Bridge Technology, Inc. v. Nokia Inc and Lucent Technologies Inc, U.S.D.Ct., E.D. Texas Marshall Division, Civil Action No. 2-05CV-151-LED.

'267 Invalidity Chart- "Report on the Random Access Ad Hoc Meeting", Golden Bridge Technology, Inc. v. Nokia Inc and Lucent Technologies Inc, U.S.D.Ct., E.D. Texas Marshall Division, Civil Action No. 2-05CV-151-LED.

'267 Invalidity Chart-629/98, Golden Bridge Technology, Inc. v. Nokia Inc and Lucent Technologies Inc, U.S.D.Ct., E.D. Texas Marshall Division, Civil Action NO. 2-05CV-151-LED.

'267 Invalidity Chart-ETSI UTRA Candidate Submission, Golden Bridge Technology, Inc. v. Nokia Inc Lucent Technologies Inc, U.S.D.Ct., E.D. Texas Marshall Division, Civil Action No. 2-05CV-151-LED.

'267 Invalidity Chart-504/98, Golden Bridge Technology, Inc. v. Nokia Inc and Lucent Technologies Inc, U.S.D.Ct., E.D. Texas Marshall Division, Civil Action No. 2-05CV-151-LED.

'267 Invalidity Chart-U.S. Patent No. 6,587,672 ("Chuah"), Golden Bridge Technology, Inc. v. Nokia Inc and Lucent technologies Inc, U.S.D.Ct., E.D. Texas Marshall Divison, Civil Action No. 2-05CV-151-LED.

'267 Invalidity Chart- U.S. Patent No. 5,430,760 ("Dent"), Golden Bridge Technology, Inc. v. Nokia Inc and Lucent Technologies Inc, U.S.D.Ct., E.D. Texas Marshall Divison, Civil Action No. 2-05Cv-151-LED.

'267 Invalidity Chart-"Modification of the Current RACH Scheme for Increased Throughout".

'267 Invalidity Chart- "Power Ramping for RACH Burst Transmission", Golden Bridge Technology, Inc. v. Nokia Inc and Lucent Technologies Inc, U.S.D.Ct., E.D. Texas Marshall Division, Civil Action No. 2-05CV-151-LED.

'267 Invalidity Chart-"Power Ramping RACH Transmission for UTRAN", Golden Bridge Technology, Inc. v. Noikia Inc and Lucent Technologies Inc, U.S.D.Ct., E.D. Texas Marshall Division, Civil Action No. 2-05CV-151-LED.

Reply Brief for Plaintiff-Appellant, filed on Oct. 29, 2007, with the United States Court of Appeals for the Circuit Court, Appeal No. 2007-1215.

Brief of Defendant-Appellee Lucent Technologies, Inc. filed on Oct. 3, 2007, with the United States Court of Appeals for the Circuit Court, Appeal No. 2007-1215.

Brief for Plaintiff-Appellant filed on Jul. 23, 2007, with the United States Court of Appeals for the Federal Circuit, Appeal No. 2007-1215.

* cited by examiner

| $g_{k,0}A$ | $g_{k,1}A$ | $g_{k,2}A$ | - - - | $g_{k,N-1}A$ |

FIG 8(A)

| $g_{k,0}A_{k,i0}$ | $g_{k,1}A_{k,i1}$ | $g_{k,2}A_{k,i2}$ | - - - | $g_{k,N-1}A_{k,i(N-1)}$ |

FIG 8(B)

$A_{k,ij} \in [A_0, A_1, A_2, \ldots, A_{N-1}]$ $A_{k1,ij} \neq A_{k2,ij}$ $$A_{k,ij} \in [A_0, A_1, A_2, \ldots, A_{N-1}]$$

$$A_{k1,ij} \neq A_{k2,ij}$$

RACH RAMP-UP ACKNOWLEDGEMENT

This application is a continuation of application Ser. No. 09/273,450 filed Mar. 22, 1999 now U.S. Pat. No. 6,574,267.

BACKGROUND OF THE INVENTION

This invention relates spread-spectrum communications, and more particularly to code-division-multiple-access (CDMA) cellular, collision detection for packet-switched systems.

DESCRIPTION OF THE RELEVANT ART

Presently proposed for a standard is a random-access burst structure which has a preamble followed by a data portion. The preamble has 16 symbols, the preamble sequence, spread by an orthogonal Gold code. A mobile station acquires chip and frame synchronization, but no consideration is given to closed-loop power control or collision detection.

SUMMARY OF THE INVENTION

An objective is to provide random channel access with reliable high data throughput and low delay on CDMA systems.

From a first RS-spread-spectrum transmitter, the steps include transmitting an access-burst signal. The access-burst signal has multiple segments at different power levels, that is to say typically at sequentially increasing power levels a collision.

The BS-spread-spectrum receiver receives at least one segment of the access burst signal at a detectable power level. In response, the BS-spread-spectrum transmitter sends an acknowledgment signal back to the first RS-spread-spectrum receiver. Receipt of the acknowledgment signal by the first RS-spread-spectrum receiver causes the RS-spread-spectrum transmitter to send data to the BS-spread-spectrum receiver. The detection of the segment at an adequate power level, acknowledgment communication and subsequent data transmission provides the remote station (RS) with random access to the channel (RACH).

The preferred embodiment also provides that when there is a collision of a first access-burst signal with a collision access-burst signal, then the BS-spread-spectrum receiver does not correctly receive the collision-detection portion of the first access-burst signal. Thus, the BS-spread-spectrum transmitter transmits to the first RS-spread-spectrum receiver, an collision-detection without reflecting the receiver, in response to receiving the collision-detection signal without the collision detection portion, the first RS-spread-spectrum transmitter transmits to the BS-spread-spectrum receiver, a second access-burst signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 8 shows the structure of the preamble;

DETAILED DESCRIPTION OF THE PREFERRED EMBODIMENTS

Figure 1:
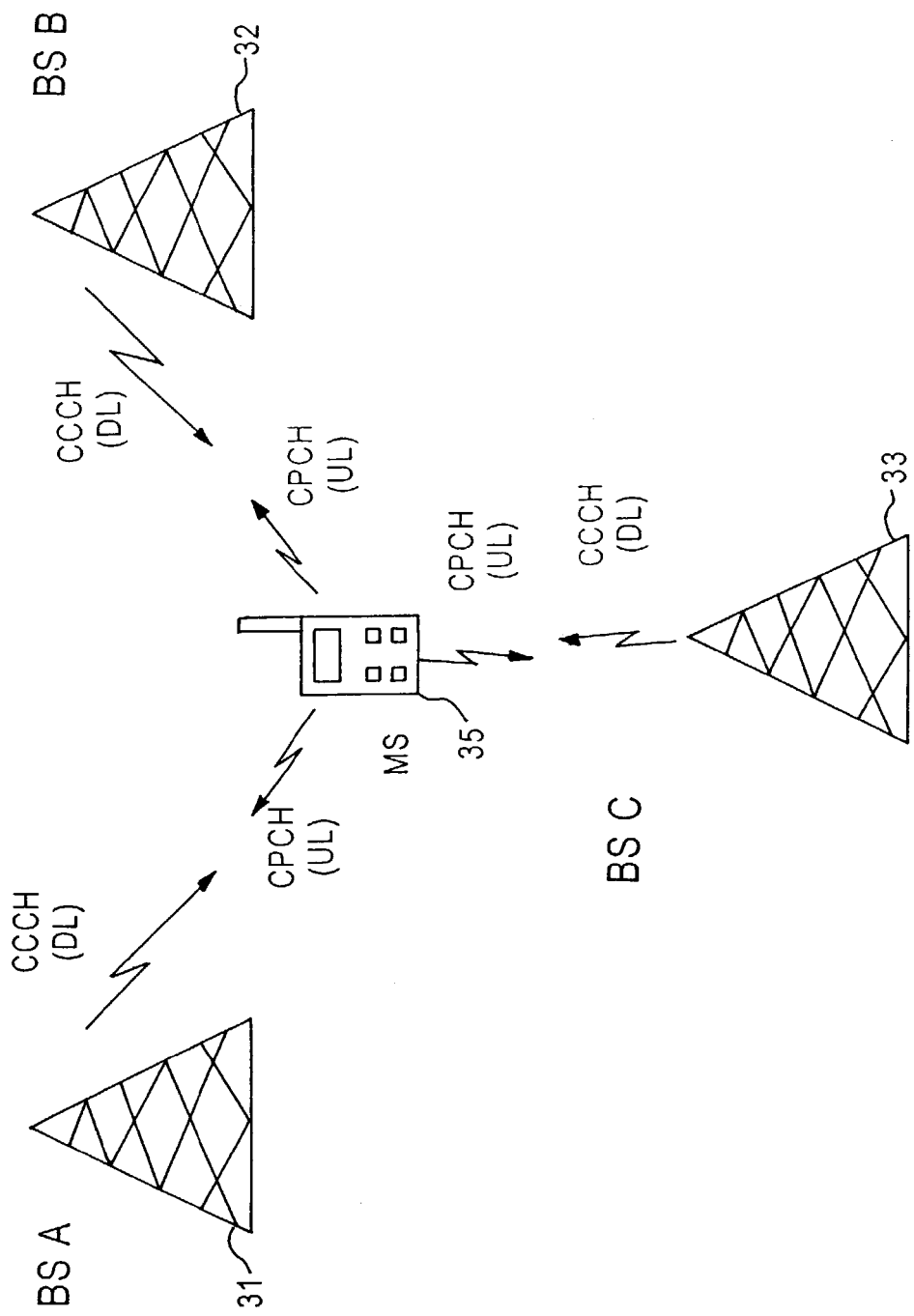
FIG. 1 is a common packet channel system block diagram with a common control downlink channel.

Reference now is made in detail to the present preferred embodiments of the invention, examples of which are illustrated in the accompanying drawings, wherein like reference numerals indicate like elements throughout the several views.

The common-packet channel is a new and novel uplink transport channel for transmitting variable size packets from a remote station to a base station within listening range, without the need to obtain a two way link with any one or set of base stations. The channel resource allocation is contention based; that is, a number of mobile stations could at any time content for the same resources, as found in an ALOHA system.

In the exemplary arrangement shown in FIG. 1, common-packet channel provides an improvement to a code-division-multiple-access (CDMA) system employing spread-spectrum modulation. The CDMA system has a plurality of base stations (BS) 31, 32, 33 and a plurality of remote stations (RS). Each remote station 35 has an RS-spread-spectrum transmitter and an RS-spread-spectrum receiver. An uplink is from the remote station 35 to a base station 31. The uplink has the common-packet channel (CPCH). A downlink is from a base station 31 to the remote station 35, and is denoted a common-control channel (CCCH). The common-control channel has common signaling used by the plurality of remote stations.

Figure 2:
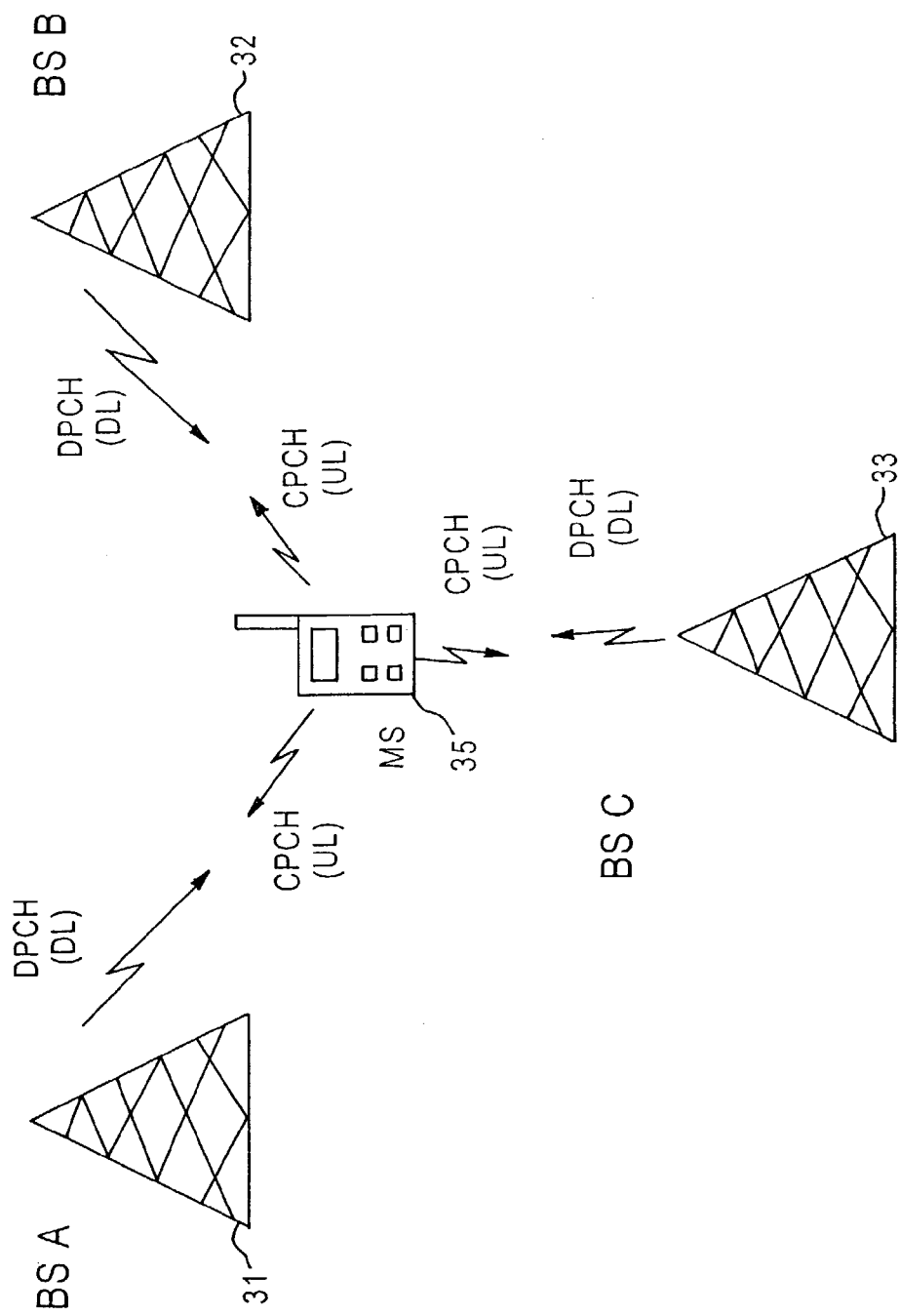
FIG. 2 is common packet channel system block diagram with a dedicated downlink channel.

An alternative to the common-control channel, but still using the common-packet channel, is the downlink dedicated physical channel (DPCH), shown in FIG. 2. The dedicated downlink channel, has signaling that is used for controlling a single remote station.

Figure 3:
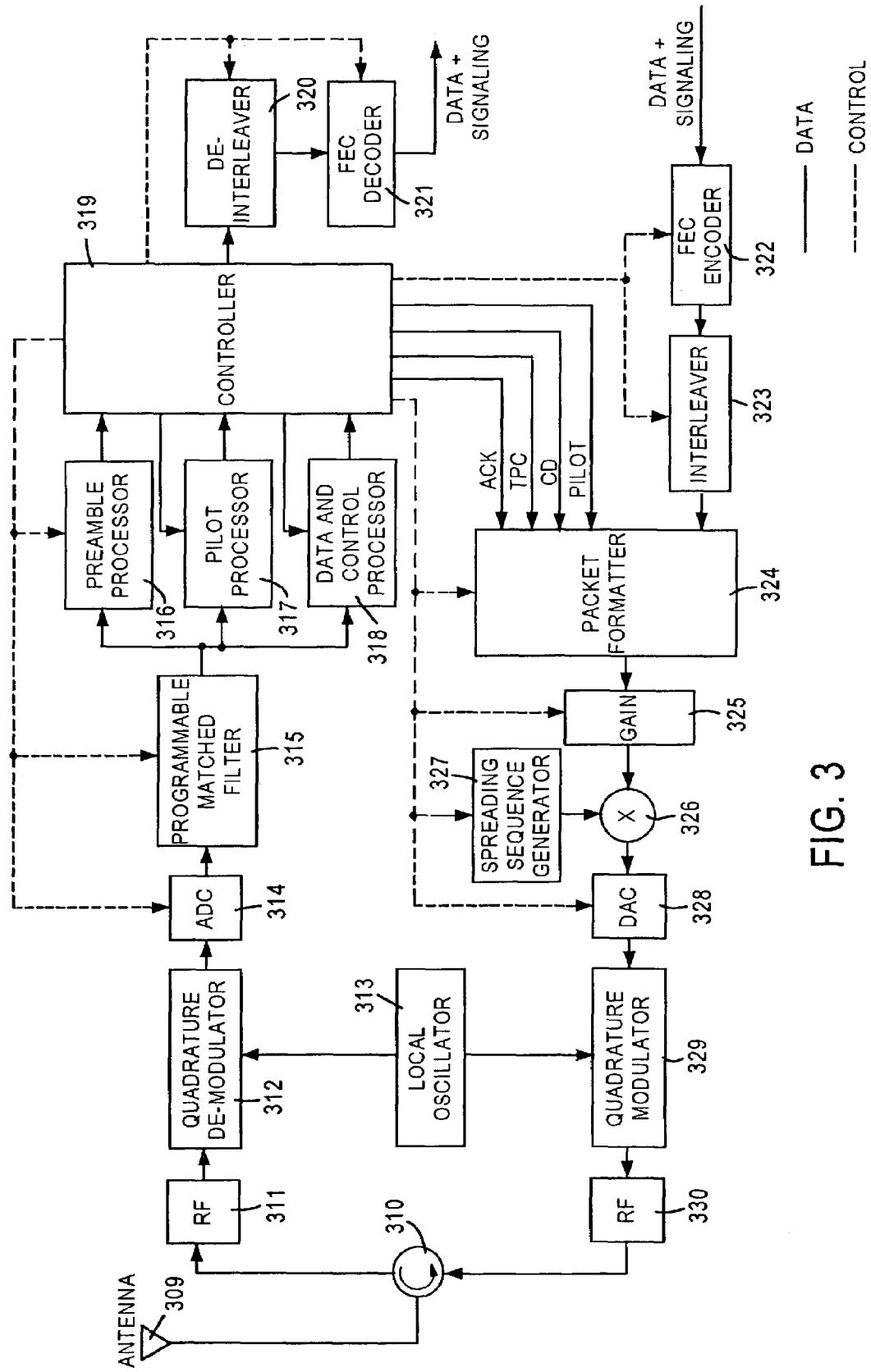
FIG. 3 is a block diagram of a base station receiver for common packet channel.

As illustratively shown in FIG. 3, a BS spread-spectrum transmitter and a BS spread-spectrum receiver is shown. The BS spread-spectrum transmitter and the BS spread-spectrum receiver are located at the base station 31. The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 315 is coupled to a programmable-matched filter 315.

A preamble processor 316, pilot processor 317 and data-and-control processor 318 are coupled to the programmable-matched filter 315. A controller 319 is coupled to the preamble processor 316, pilot processor 317 and data-and-control processor 318. A de-interleaver 320 is coupled between the controller 319 and a forward-error-correction (FEC) decoder 321.

The BS spread-spectrum transmitter includes a forward-error-correction (FEC) encoder 322 coupled to an interleaver 323. A packet formatter 324 is coupled to the interleaver 323 and to the controller 319. A variable gain device 325 is coupled between the packet formatter 324 and a product device 326. A spreading-sequence generator 327 is coupled to the product device 326. A digital-to-analog converter 328 is coupled between the product device 328 and quadrature modulator 329. The quadrature modulator 329 is coupled to the local oscillator 313 and a transmitter RF section 330. The transmitter RF section 330 is coupled to the circulator 310.

The controller 319 has control links coupled to the analog-to-digital converter 314, programmable-matched filter 315, preamble processor 316, the digital-to-analog converter 328, the spreading sequence generator 327, the variable gain device 325, the packet formatter 324, the de-interleaver 320, the FEC decoder 321, the interleaver 323 and the FEC encoder 322.

A received spread-spectrum signal from antenna 309 passes through circulator 310 and is amplified and filtered by receiver RF section 311. The local oscillator 313 generates a local signal which quadrature demodulator 312 uses to demodulator in-phase and quadrature phase components of the received spread-spectrum signal. The analog-to-digital converter 314 converts the in-phase component and the quadrature-phase component to a digital signal. These functions are well known in the art, and variations to this block diagram can accomplish the same function.

The programmable-matched filter 315 despreads the received spread-spectrum signal. A correlator, as an alternative, may be used as an equivalent means for despeading the received spread-spectrum signal.

The preamble processor 316 detects the preamble portion of the received spread-spectrum signal. The pilot processor detects and synchronizes to the pilot portion of the received spread-spectrum signal. The data and control processor detects and processes the data portion of the received spread-spectrum signal. Detected data passes through the controller 319 to the de-interleaver 320 and FEC decoder 321. Data and signaling are outputted from the FEC decoder 321.

In the BS transmitter, data are FEC encoded by FEC encoder 322, and interleaved by interleaver 323. The packet formatter formats data, signaling, acknowledgment signal, collision detection signal, pilot signal and transmitting power control (TPC) signal into a packet. The packet is outputted from packet formatter, and the packet level is amplified or attenuated by variable gain device 325. The packet is spread-spectrum processed by product device 326, with a spreading chip-sequence from spreading-sequence generator 327. The packet is converted to an analog signal by digital-to-analog converter 328, and in-phase and quadrature-phase components are generated by quadrature modulator 329 using a signal from local oscillator 313. The packet is translated to a carrier frequency, filtered and amplified by transmitter RF section 330, and then passes through circulator 310 and is radiated by antenna 309.

Figure 4:
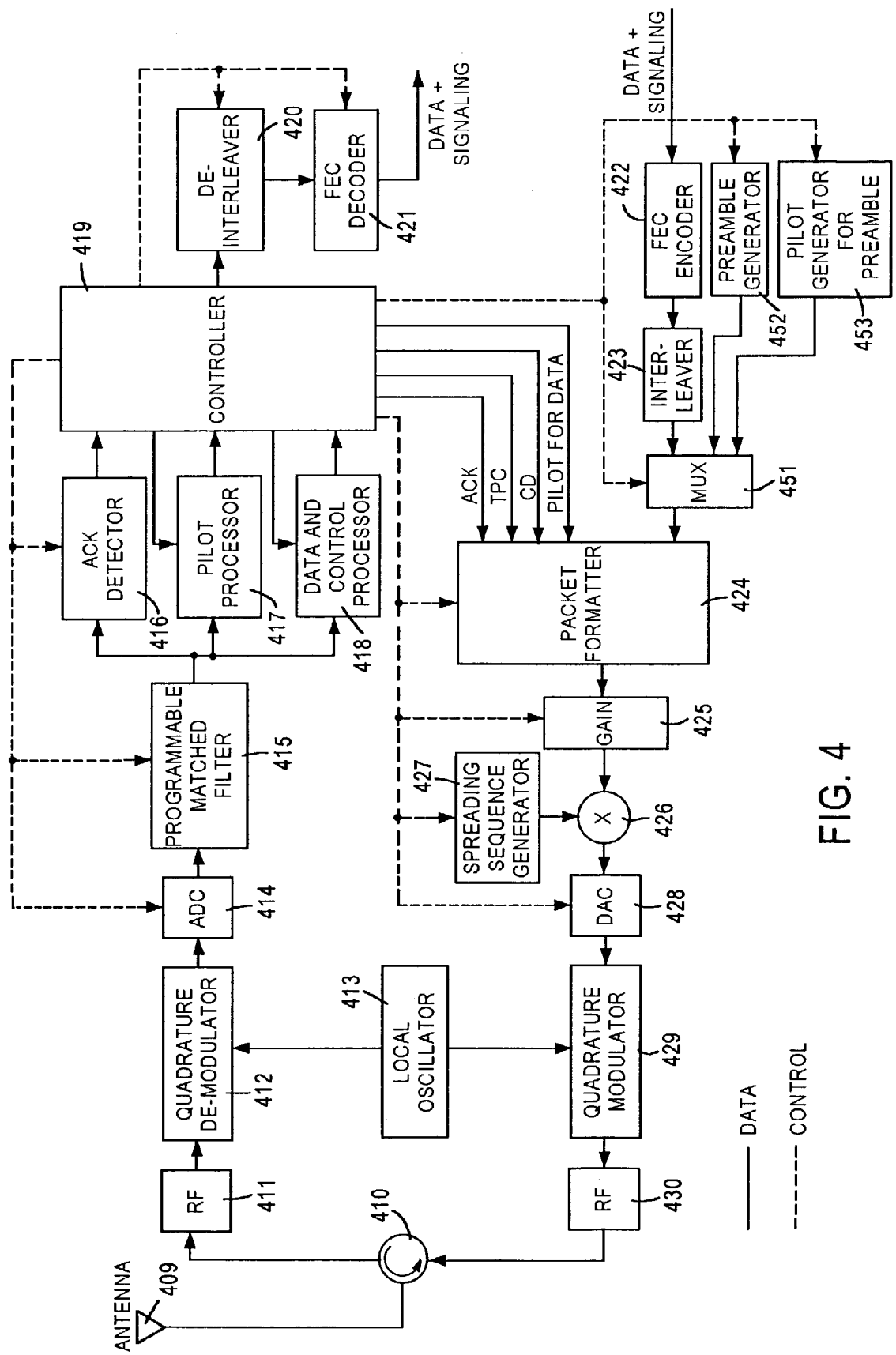
FIG. 4 is a block diagram of a remote station receiver and transmitter for common packet channel.

In the illustrative embodiment shown in FIG. 4, a RS spread-spectrum transmitter and a RS spread-spectrum receiver are shown. The RS spread-spectrum transmitter and the RS spread-spectrum receiver are located at the mobile implementation of the remote station 35, shown as an MS (mobile station) in FIG. 1. The RS spread-spectrum receiver includes an antenna 409 coupled to a circulator 410, a receiver radio frequency (RF) section 411, a local oscillator 413, a quadrature demodulator 412, and an analog-to-digital converter 414. The receiver RF section 411 is coupled between the circulator 410 and the quadrature demodulator 412. The quadrature demodulator is coupled to the local oscillator 413 and to the analog to digital converter 414. The output of the analog-to-digital converter 415 is coupled to a programmable-matched filter 415.

An acknowledgment detector 416, pilot processor 417 and data-and-control processor 418 are coupled to the programmable-matched filter 415. A controller 419 is coupled to the acknowledgment detector 416, pilot processor 417 and data-and-control processor 418. A de-interleaver 420 is coupled between the controller 419 and a forward-error-correction (FEC) decoder 421.

The RS spread-spectrum transmitter includes a forward-error-correction (FEC) encoder 422 coupled to an interleaver 423. A packet formatter 424 is coupled through a multiplexer 451 to the interleaver 423 and to the controller 419. A preamble generator 452 and a pilot generator 453 for the preamble are coupled to the multiplexer 451. A variable gain device 425 is coupled between the packet formatter 424 and a product device 426. A spreading-sequence generator 427 is coupled to the product device 426. A digital-to-analog converter 428 is coupled between the product device 428 and quadrature modulator 429. The quadrature modulator 429 is coupled to the local oscillator 413 and a transmitter RF section 430. The transmitter RF section 430 is coupled to the circulator 410.

The controller 419 has control links coupled to the analog-to-digital converter 414, programmable-matched filter 415, acknowledgment detector 416, the digital-to-analog converter 428, the spreading sequence generator 427, the variable gain device 425, the packet formatter 424, the de-interleaver 420, the FEC decoder 421, the interleaver 423, the FEC encoder 422, the preamble generator 452 and the pilot generator 453.

A received spread-spectrum signal from antenna 409 passes through circulator 410 and is amplified and filtered by receiver RF section 411. The local oscillator 413 generates a local signal which quadrature demodulator 412 uses to demodulate in-phase and quadrature phase components of the received spread-spectrum signal. The analog-to-digital converter 414 converts the in-phase component and the quadrature-phase component to a digital signal. These functions are well known in the art, and variations to this block diagram can accomplish the same function.

The programmable-matched filter 415 despreads the received spread-spectrum signal. A correlator, as an alternative, may be used as an equivalent means for despeading the received spread-spectrum signal.

The acknowledgment detector 416 detects an acknowledgment in the received spread-spectrum signal. The pilot processor detects and synchronizes to the pilot portion of the received spread-spectrum signal. The data and control processor detects and processes the data portion of the received spread-spectrum signal. Detected data passes through the controller 419 to the de-interleaver 420 and FEC decoder 421. Data and signaling are outputted from the FEC decoder 421.

In the RS transmitter, data are FEC encoded by FEC encoder 422, and interleaved by interleaver 423. The preamble generator 452 generates a preamble and the pilot generator 453 generates a pilot for the preamble. The multiplexer 451 multiplexes the data, preamble and pilot, and the packet formatter 424 formats the preamble, pilot and data into a common-packet channel packet. Further, the packet formatter formats data, signaling, acknowledgment signal, collision detection signal, pilot signal and TPC signal into a packet. The packet is outputted from packet formatter, and the packet level is amplified or attenuated by variable gain device 425. The packet is spread-spectrum processed by product device 426, with s spreading chip-sequence from spreading-sequence generator 427. The packet is converted to an analog signal by digital-to-analog converter 428, and in-phase and quadrature-phase components are generated by quadrature modulator 429 using a signal from local oscillator 413.

Figure 5:
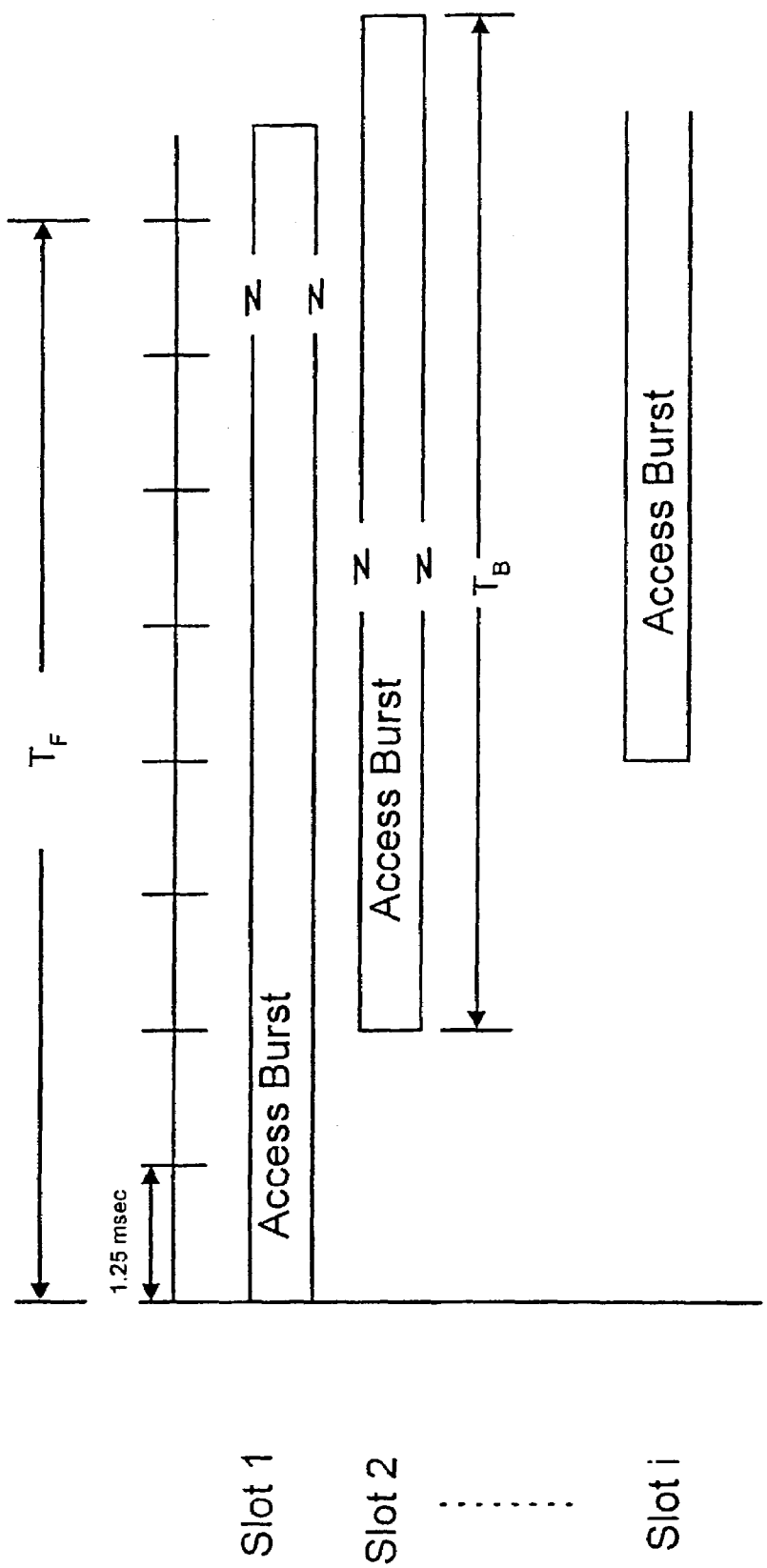
FIG. 5 is a timing diagram for access burst transmission.

Referring to FIG. 5, the base station transmits a common-synchronization channel, which has a frame time duration $T_F$. The common-synchronization channel has a common chip-sequence signal, which is common to the plurality of remote stations communicating with the particular base station. In a particular embodiment, the time $T_F$ of one frame is ten milliseconds. Within one frame, there are eight access slots. Each access slot lasts 1.25 milliseconds. Timing for the access slots is the frame timing, and the portion of the common-synchronization channel with the frame timing is denoted the frame-timing signal. The frame-timing signal is the timing a remote station uses in selecting an access slot in which to transmit an access-burst signal.

A first remote station attempting to access the base station, has a first RS-spread-spectrum receiver for receiving the common synchronization channel, broadcast from the base station. The first RS-spread-spectrum receiver determines frame timing from the frame-timing signal.

A first RS-spread-spectrum transmitter, located at the first remote station, transmits an access-burst signal. An access burst signal, as shown in FIG. 5, starts at the beginning of an access slot, as defined by the frame timing portion of the common-synchronization channel.

Figure 6:
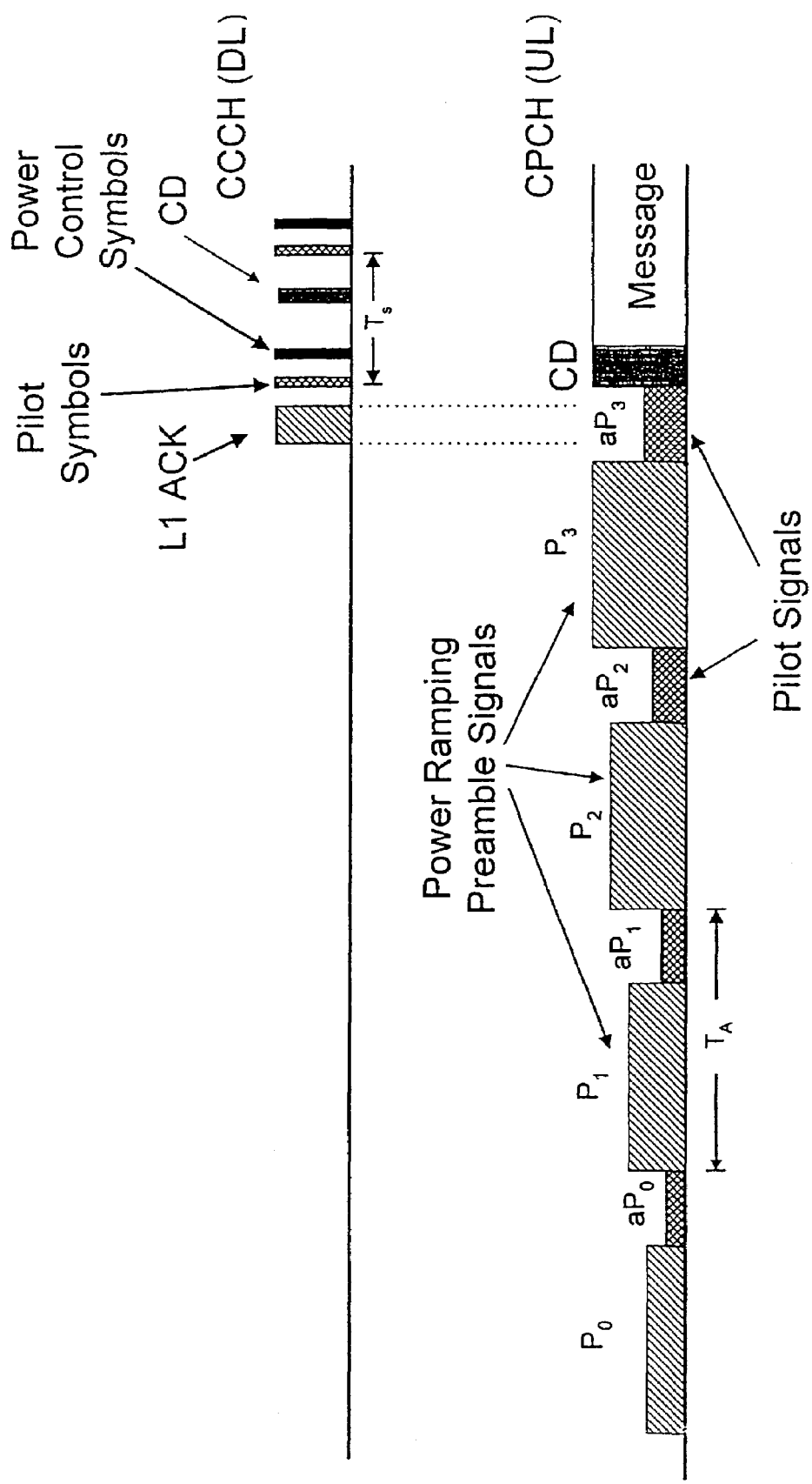
FIG. 6 illustrates common packet channel access burst of FIG. 5 using a common control downlink channel.
Figure 7:
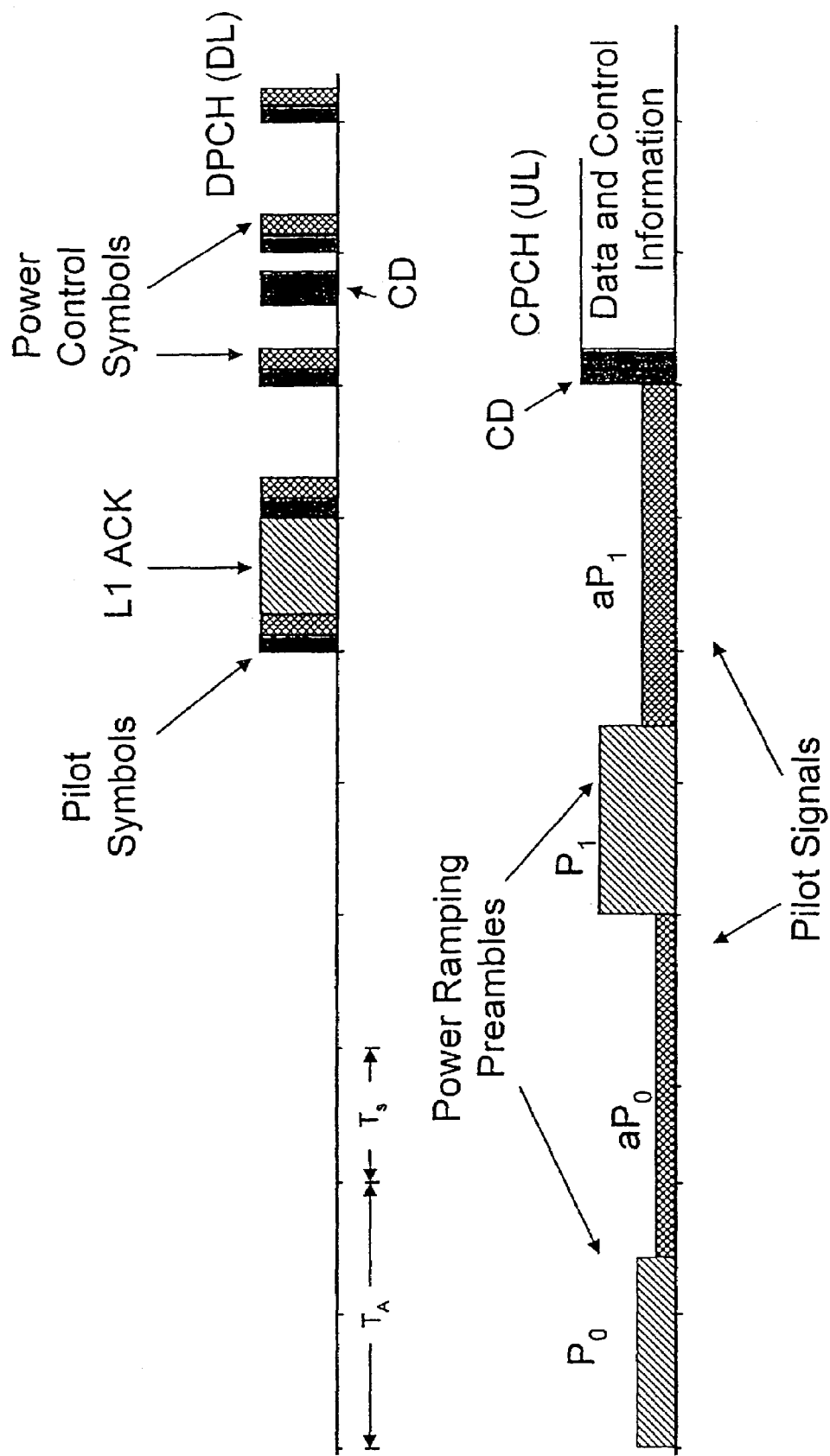
FIG. 7 illustrates common packet channel access of FIG. 5 using a dedicated downlink channel

FIG. 6 illustratively shows the common-packet channel access burst format, for each access-burst signal. Each access-burst signal has a plurality of segments. Each segment has a preamble followed by a pilot signal. The plurality of segments has a plurality of power levels, respectively. More particularly, the power level of each segment increases with each subsequent segment. Thus, a first segment has a first preamble and pilot, at a first power level $P_0$. A second segment has a second preamble and a second pilot, at a second power level $P_1$. The third segment has a third preamble and a third pilot at a third power level $P_2$. The first preamble, the second preamble, the third preamble, and subsequent preambles, may be identical or different. The power level of the pilot preferably is less than the power level of the preamble. A preamble is for synchronization, and a corresponding pilot, which follows a preamble, is to keep the BS spread-spectrum receiver receiving the spread-spectrum signal from the remote station, once a preamble is detected.

A subsequent increase or decrease of power levels is basically a closed loop power control system. Once a BS spread-spectrum receiver detects a preamble from the remote station, the BS spread-spectrum transmitter sends an acknowledgment (ACK) signal.

Figure 9A:
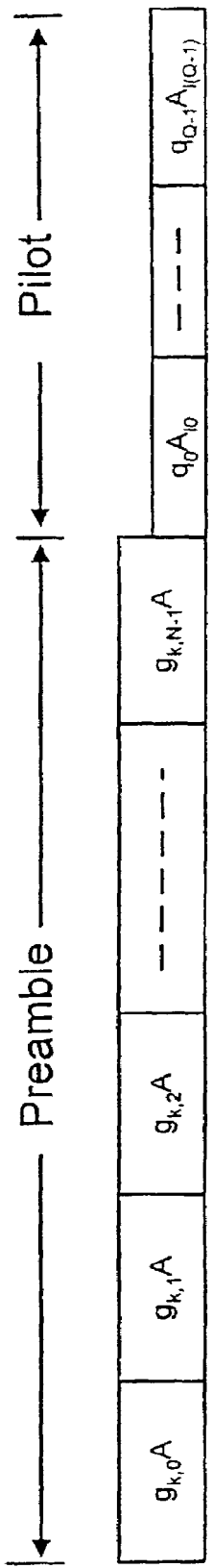
FIG. 9 illustrates preamble and pilot formats.
Figure 9B:
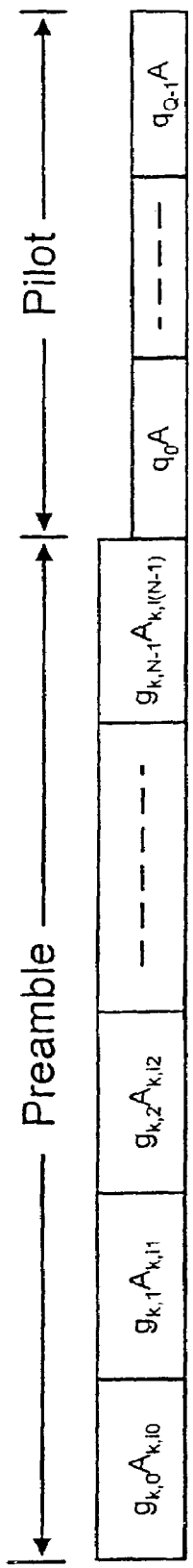

Referring to FIG. 4, the preamble is generated by preamble generator 452 and the pilot is generated by pilot generator 453. A preamble format is shown in FIG. 8. The preamble format with a pilot is shown in FIG. 9. The multiplexer 451, with timing from the controller 419, selects the preamble then a corresponding pilot, for packet formatter 424. A series of preambles and pilots may be generated and made as part of the packet by packet formatter 424. The preambles and pilots can have their power level adjusted either in the preamble generator 452 and pilot generator 453, or by the variable gain device 425.

The BS spread-spectrum receiver receives the access-burst signal at a detected-power level. More particularly, the access-burst signal has the plurality of preambles at a plurality of power levels, respectively. When a preamble with sufficient power level is detected at the BS spread-spectrum receiver, then an acknowledgment (ACK) signal is transmitted from the BS spread-spectrum transmitter. The ACK signal is shown in FIG. 6, in response to the fourth preamble having sufficient power for detection by the BS spread-spectrum receiver.

FIG. 3 shows the preamble processor 316 for detecting the preamble and the pilot processor 317 for continuing to receive the packet after detecting the preamble. Upon detecting the preamble, the processor 319 initiates an ACK signal which passes to packet formatter 324 and is radiated by the BS spread-spectrum transmitter.

The first RS-spread-spectrum receiver receives the acknowledgment signal. Upon receiving the ACK signal, the first RS-spread-spectrum transmitter transmits to the BS-spread-spectrum receiver, a spread-spectrum signal having data. The data is shown in FIG. 6, in time, after the ACK signal. The data may include includes a collision detection (CD) portion of the signal, referred to herein as a collision detection signal, and message.

Figure 10:
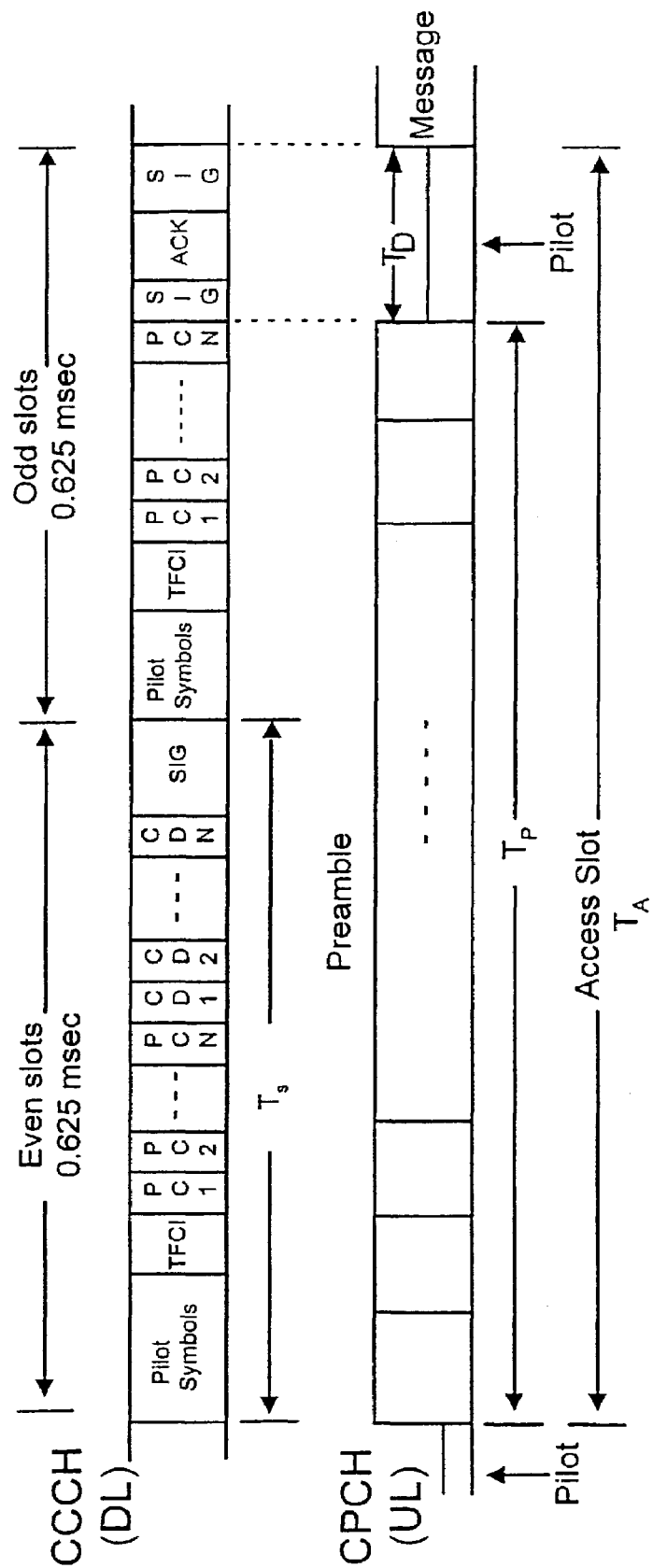
FIG. 10 is a common packet channel timing diagram and frame format of the down link common control link.

In response to each packet transmitted from the RS spread-spectrum transmitter, the BS receiver detects the collision detection portion of the data, and retransmits the data field of the collision detection portion of the data to the remote station. FIG. 10 shows the timing diagram for re-transmitting the collision detection field. There are several slots for collision detection retransmission, which can be used for re-transmitting the collision detection field for several remote stations. If the collision detection field were correctly re-transmitted to the remote station, then the remote station knows its packet is successfully received by the base station. If the collision detection field were not correctly re-transmitted by the base station, then the remote station assumes there is a collision with a packet transmitted by another remote station, and stops further transmission of the data.

In operation, an overview of the way this transport mechanism is used is as follows. A remote station (RS) upon power up searches for transmission from nearby base stations. Upon successful synchronization with one or more base stations, the Remote station receives the necessary system parameters from a continuously transmitted by all base stations broadcast control channel (BCCH). Using the information transmitted from the BCCH, the remote station can determine various parameters required when first transmitting to a base station. Parameters of interest are the loading of all the base stations in the vicinity of the remote station, their antenna characteristics, spreading codes used to spread the downlink transmitted information, timing information and other control information. With this information, the remote station can transmit specific waveforms in order to capture the attention of a nearby base station. In the common packet channel the remote station, having all the necessary information from the nearby base station, it starts transmitting a particular preamble from a set of predefined preambles, at a well selected time intervals. The particular structure of the preamble waveforms is selected on the basis that detection of the preamble waveform at the base station is to be as easy as possible with minimal loss in detectability.

The physical common packet channel (CPCH) is used to carry the CPCH. It is based on the well known Slotted ALOHA approach. There is a number of well defined time offsets relative to the frame boundary of a downlink received BCCH channel. These time offsets define access slots. The number of access slots is chosen according to the particular application at hand. As an example, shown in FIG. 5, eight access slots are spaced 1.25 msec apart in a frame of 10-msec duration.

According to FIG. 5, a remote station picks an access slot in a random fashion and tries to obtain a connection with a base station by transmitting a preamble waveform. The base station is able to recognize this preamble, and is expecting its reception at the beginning of each access slot. The length of the access burst is variable and the length of the access burst is allowed to vary from a few access slots to many frame durations. The amount of data transmitted by the remote station could depend on various factors. Some of those are: class capability of the remote station, prioritization, the control information transmitted down by the base station, and various bandwidth management protocols residing and executed at the base station. A field at the beginning of the data portion signifies the length of the data.

The structure of the access burst is shown in FIG. 6. The access burst starts with a set of preambles of duration $T_P$ whose power is increased in time from preamble to preamble in a step-wise manner. The transmitted power during each preamble is constant. For the duration $T_D$ between preambles the access burst consists of a pilot signal transmitted at a fixed power level ratio relative to the previously transmitted preamble. There is a one to one correspondence between the code structure of the preamble and the pilot signal. The pilot signal could be eliminated by setting it to a zero power level.

The transmission of the preambles ceases if the preamble has been picked up detected by the base station and the base station has responded to the remote station with a layer one acknowledgment L1 ACK, which the remote station has also successfully received. Alternatively, transmission of the preamble ceases if the remote station has transmitted the maximum allowed number of preambles Mp without acknowledgement. Upon receiving an L1 ACK the remote station starts transmission of its data. Once the remote station has transmitted more than Mp preambles, it undergoes a forced random back off procedure. This procedure forces the remote station to delay its access burst transmission for a later time. The random back off procedure could be parameterized based on the priority statues of the Remote station. The amount by which the power is increased from preamble to preamble is Dp which is either fixed for all cells at all times or it is repeatedly broadcast via the BCCH. Remote stations with different priority statuses could use a power increase which depends on a priority status assigned to the remote station. The priority status could be either predetermined or assigned to the remote station after negotiation with the base station.

The Preamble Signal Structure

There is a large set of possible preamble waveforms. Every base station is assigned a subset of preambles from the set of all preamble waveforms in the system. The set of preambles a base station is using is broadcast through it's BCCH channel. There are many ways of generating preamble waveforms. One existing way is to use a single orthogonal Gold code per preamble from the set of all possible orthogonal Gold codes of length L. A preamble could then be constructed by repeating the Gold code a number of times N to transmit a length N complex sequence. For example if A denotes the orthogonal Gold code and $G_i=\{g_{i,0}\ g_{i,1}g_{i,2}\ \ldots\ g_{i,N-1}\}$ a length N complex sequence, then a preamble could be formed as shown in FIG. 8, where, $g_{i,j}$, j=0, . . . , N−1, multiplies every element in A. Normally the sets of $G_i$'s are chosen to be orthogonal to each other. This will allow D for a maximum of N possible waveforms. The total number of possible preambles is then L*N.

The preferred approach is to use different codes rather than a single repeating code in generating each preamble. In that case, if L possible codes, not necessarily Gold Codes, were possible, designated by $A_0, A_1, \ldots A_{L-1}$, then possible preambles will be as shown in FIG. 8. The order of the $A_i$'s can be chosen so that identical codes are not used in the same locations for two different preambles. A similar approach could be used to form the pilot signals.

The Downlink Common Control Channel

In FIG. 10, the downlink common control channel structure for even and odd slots is shown. The even slots contain reference data and control data. The pilot symbols are used to derive a reference for demodulating the remaining control symbols. The control symbols are made of transport frame indicator (TFI) symbols, power control (PC) symbols, collision detection (CD) symbol and signaling symbols (SIG). The odd slots contain all the information that the even slots contain plus an acknowledgment (ACK) signal. Odd slots do not include collision detection fields.

The uplink CPCH is shown over the last transmitted preamble. After the last transmitted preamble, the base station has successfully detected the transmission of the last transmitted preamble and transmits back the acknowledgment signal. During the same time, the remote station is tuned to receive the ACK signal. The ACK signal transmitted corresponds to the specific preamble structure transmitted on the uplink. Once the remote station detects the ACK signal corresponding to transmitted preamble by the remote station, the remote station begins transmission of its data.

Figure 11:
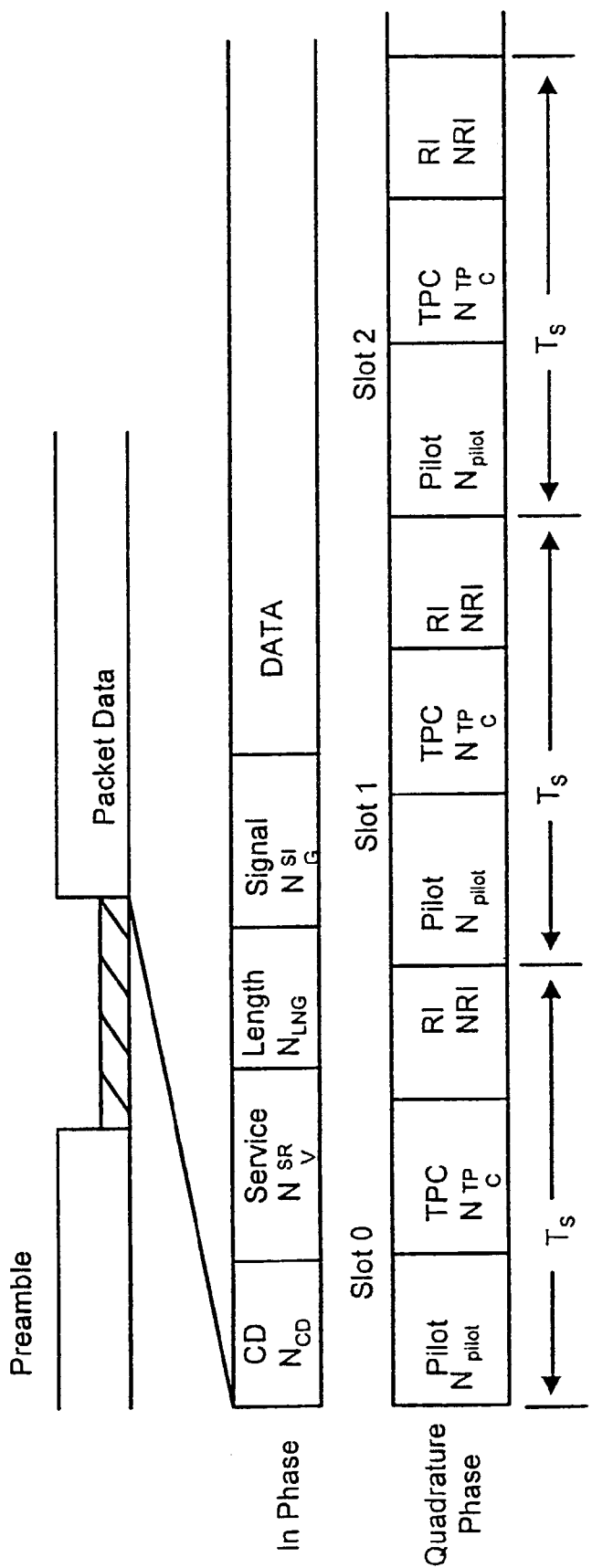
FIG. 11 illustrates frame format of common packet channel, packet data.

Corresponding with the preamble structure in the uplink there is a corresponding in time power control information symbol and a corresponding in time collision detection field. Upon start of data transmission the remote station uses the downlink transmitted power control information to adjust its transmitted power. The power control symbols are decoded to derive binary decision data, which is then used to increase or decrease the transmitted power accordingly. FIG. 11 shows the structure of the uplink frame and the slot format for the data portion of the uplink transmission. Data and control information is transmitted in an in-phase and quadrature-phase multiplexed format. That is, the data portion could be transmitted on the in-phase coordinate and the control portion on the quadrature-phase coordinate. The modulation for the data and control is BPSK. The control channel may contain the information for the receiver to enable the demodulation of the data. The control channel provides for upper layer system functionality. The data portion consists of one or more frames. Each frame consists of a number of slots. As an example the frame duration could be 10 milliseconds long and the slot duration 0.625 milliseconds long. In that case, there are 16 slots per frame. The beginning of the data payload contains a collision detection field used to relay information about the possibility of collision with other simultaneously transmitting remote stations. The collision detection field is read by the base station. The base station expects the presence of the collision detection field since it had provided an ACK signal at the last time slot.

The collision detection field includes a temporary identification (ID) number chosen at random by the mobile for the transmission of the current packet. The base station reads the collision detection field and reflects, or transmits back, the collision detection field on the downlink. If the collision detection field detected by the remote station matched the one just being transmitted by the same remote station, then the collision detection field is an identification that the transmission is being received correctly. The remote station then continues transmitting the remaining of the packet. In case the collision detection field has not been received correctly by the remote station, then the remote station considers the packet reception by the base station as erroneous and discontinues transmission of the remaining packet.

The function of the remaining fields are as follows. The Pilot field enables the demodulation of both the data and control bits. The transmitted power control (TPC) bits are used to control the power of a corresponding downlink channel, in case a down link channel directed to the same user is operational. If the downlink channel were not operational, then the TPC control bits can be used to relay additional pilot bits instead.

The Rate Information (RI) field is used to provide the transmitter with the ability to change its data rate without the necessity to explicitly negotiate the instantaneous data rate with the base station. The service field provides information of the particular service the data bits are to be used for. The length field specifies the time duration of the packet. The signal field can be used to provide additional control information as required.

Additional functionalities of the common packet channel are: (1) bandwidth management and (2) L2 acknowledgment mechanism.

The bandwidth management functionality is implemented via signaling information on the down link common control channel. There are three ways for incorporating this functionality. The first relies on changing the priority status of all uplink users, which currently are transmitting information using the CPCH. By this method all the users are remapping their priority status via a control signal sent at the downlink. When the priority of the CPCH users is lowered their ability to capture an uplink channel is lowered. Thus the amount of data sent on the uplink by the CPCH users is thus reduced. The other mechanism is for the base station to relay the maximum possible data rate the CPCH users are allowed to transmit. This prevents the CPCH users from transmitting at a rate which could possibly exceed the uplink system capacity and therefore take the cell down, i.e., disrupt the communication for all users currently connected to the base station. For the third method, the base station could provide a negative acknowledgment through the ACK signal. In this case, any remote station which is tuned to receive the ACK signal is prohibited from further transmission of an access-burst signal.

The L2 acknowledgment (L2 ACK) mechanism, which is different than the L1 ACK, is used by the base station to notify the remote station for the correctness of an uplink packet reception. The base station could either relay to the remote station which portions of the packet have being received correctly or which have being received incorrectly. There are many existing ways of implementing a particular protocol to relay this type of information. For example, the packet could be identified as consisting of a number of frames, with each frame consisting of a number of sub-frames. The frames are identified by a predetermined number. The sub-frames in each frame are also identified by a specific number. One way for the base to relay the information about the correctness of the packet is to identify all the frames and sub-frames that have been received correctly. Another way is to identify the frames and sub-frames that have been received in error. The way the base station could identify the correctness of a frame or sub-frame is by checking its cyclic residue code (CRC) field. Other more robust mechanisms for acknowledgment may be used.

CD Operation

There are many remote stations that might try to access the base station at the same time. There is a number of different preamble signals which a remote station can use for reaching the base station. Each remote station chooses at random one of the preamble signals to use for accessing the base station. The base station transmits a broadcast common synchronization channel. This broadcast common synchronization channel includes a frame timing signal. The remote stations extract the frame timing transmitted by the base station by receiving the broadcast common synchronization channel. The frame timing is used by the remote stations to derive a timing schedule by dividing the frame duration in a number of access slots. The remote stations are allowed to transmit their preambles only at the beginning of each access slot. The actual transmit times for different remote stations could be slightly different due to their different propagation delays. This defines an access protocol commonly known as the slotted ALOHA access protocol. Each remote station repeatedly transmits its preamble signal until the base station detects the preamble, acknowledges that the preamble is received, and the acknowledgment is correctly received by the remote station. There could be more than one remote station transmitting the same preamble signal in the same access slot. The base station cannot recognize if two or more remote stations were transmitting the same preamble in the same access slot. When the base station detects the transmission of a preamble signal, it transmits back an acknowledgment message. There is one acknowledgment message corresponding to each possible preamble signal. Therefore, the are as many acknowledgment messages as there are preamble signals. Every transmitting remote station which receives an acknowledgment message corresponding to its transmitting preamble signal, will start transmitting its message. For each preamble signal, there is a corresponding spreading code used by the base station to transmit the message. The message transmission always starts at the beginning of an access slot. Since there could be a number of remote stations using the same preamble signal in the same access slot, they start transmitting their message at the same time using the same spreading code. In that case, the transmissions of the remote stations likely interferes with each other and thus is not received correctly.

Each remote station includes a collision detection (CD) field in the beginning of the transmitted message. The CD field is chosen at random by each remote station and independently from each other Remote Station. There is a predefined limited number of CD fields. Two remote stations transmitting their message at the same time most likely chose a different CD field. When the base station receives the CD field, the base station reflects back, transmits back, the CD field to the remote station. The remote station reads the reflected CD field by the base station. If the reflected CD field matched the the CD field the remote station transmitted, the the remote station assumes that the remote station is being received correctly by the base station and continue transmitting the rest of the message, or data. If the reflected CD field from the base station did not match the one transmitted by the remote station, then the remote station assumes that there has been a collision and stops transmitting the remaining message or data.

It will be apparent to those skilled in the art that various modifications can be made to the collision detection systems of the instant invention without departing from the scope or spirit of the invention, and it is intended that the present invention cover modifications and variations of the collision detection system provided they come within the scope of the appended claims and their equivalents.

We claim:

1. A method of sending packet data from a remote station, the method comprising:
   receiving a broadcast common channel from a base station;
   determining at least one parameter required for transmission to the base station from the received broadcast common channel;
   transmitting an access-burst signal, the access-burst signal comprising a plurality of segments, each segment comprising a selected access preamble and a pilot signal, the preambles having sequentially increasing discrete power levels;
   if the number of transmitted access preambles has reached a maximum allowed number of preambles Mp without detecting an acknowledgement comprising a signal corresponding to a transmitted access preamble, ceasing preamble transmission; and
   upon detecting an acknowledgment comprising a signal corresponding to a transmitted access preamble, ceasing preamble transmission, and spread-spectrum transmitting the packet data from the remote station.

2. The method as in claim 1, wherein power level of the pilot signal is set to a zero power level.

3. The method as in claim 1, wherein the pilot signals of the plurality of segments of the access-burst signal have sequentially increasing descrete power levels.

4. The method as in claim 1, wherein the step of determining at least one parameter comprises determining timing of the transmission of at least one of the access preambles.

5. A method as in claim 1, wherein the determining step comprises choosing the selected preamble from among a set of predefined preambles associated with a base station.

6. The method of claim 1, wherein the acknowledgement is a level 1 acknowledgement.

7. The method of claim 1, wherein the power level of the pilot signal is less than the power level of the preamble.

8. A method of sending packet data from a remote station, the method comprising:
   receiving a broadcast common channel from a base station;
   determining at least one parameter required for transmission to the base station from the received broadcast common channel, comprising determining timing of the transmission of at least one of the access preambles by randomly choosing one of a plurality of time slots defined in relation to the received broadcast common channel to start the transmitting of the access burst signal;
   transmitting an access-burst signal, the access-burst signal comprising a plurality of segments having a plurality of constant power levels, each segment comprising a selected access preamble and a pilot signal;
   if the number of transmitted access preambles has reached a maximum allowed number of preambles Mp without detecting an acknowledgement comprising a signal corresponding to a transmitted access preamble, ceasing preamble transmission; and
   upon detecting an acknowledgement comprising a signal corresponding to a transmitted access preamble, ceasing preamble transmission, and spread-spectrum transmitting the packet data from the remote station.

9. A remote station for wireless communication with a base station of a network, the remote station comprising:
   a spread-spectrum transmitter;
   a spread-spectrum receiver; and
   a controller coupled to the receiver for responding to signals received via the receiver and coupled for controlling the transmitter, such that in operation the remote station is for performing the following steps:
   (a) transmitting an access-burst signal, the access-burst signal comprising a plurality of segments having sequentially increasing discrete power levels, each segment comprising a selected access preamble;
   (b) if the number of transmitted access preambles has reached a maximum allowed number of preambles Mp without detecting an acknowledgement comprising a signal corresponding to a transmitted access preamble, ceasing preamble transmission; and
   (c) upon detecting an acknowledgement comprising a signal corresponding to a transmitted access preamble, ceasing preamble transmission, and spread-spectrum transmitting the packet data from the remote station,
   wherein the spread-spectrum transmitter comprises:
   (1) a spreading sequence generator;
   (2) a product device coupled to an output of the spreading sequence generator and coupled to receive an access preamble and the packet data; and
   (3) a digital analog converter responsive to an output of the product device.

10. A remote station for wireless communication with a base station of a network, the remote station comprising:
    a spread-spectrum transmitter;
    a spread-spectrum receiver; and
    a controller coupled to the receiver for responding to signals received via the receiver and coupled for controlling the transmitter, such that in operation the remote station is for performing the following steps:
    (a) transmitting an access-burst signal, the access-burst signal comprising a plurality of segments having sequentially increasing discrete power levels, each segment comprising a selected access preamble;
    (b) if the number of transmitted access preambles has reached a maximum allowed number of preambles Mp without detecting an acknowledgement comprising a signal corresponding to a transmitted access preamble, ceasing preamble transmission; and
    (c) upon detecting an acknowledgement comprising a signal corresponding to a transmitted access preamble, ceasing preamble transmission, an spread-spectrum transmitting the packet data from the remote station,
    wherein the spread-spectrum receiver comprises:
    (1) an analog to digital converter responsive to a signal received by the remote station; and
    (2) a programmable matched filter responsive to an output of the analog to digital converter.

11. A base-band processor for use in a wireless remote station for communication of data, the remote station having a spread-spectrum modulator and a spread-spectrum demodulator, the base-band processor comprising:

an acknowledgment detector, coupled to the demodulator, for detecting an acknowledgment in a received spread-spectrum signal;

a preamble generator for generating access preamble signals;

a multiplexer for multiplexing the data and the access preamble signals and supplying the multiplexed data and access preamble signals to the modulator for transmission; and a controller coupled to the acknowledgment detector and coupled for controlling the modulator, the preamble generator and the multiplexer, such that in operation the remote station performs the following steps:

(a) spreading an access preamble selected from a set of predefined preamble, associated with the base station;

(b) transmitting from the remote station an access-burst signal, the access-burst signal comprising a plurality of segments having sequentially increasing discrete power levels, each segment comprising the spread selected access preamble;

(c) if the number of transmitted access preambles has reached a maximum allowed number of preambles Mp without detecting an acknowledgement comprising a signal corresponding to the transmitted access preamble, ceasing preamble transmission; and (d) upon detecting an acknowledgement comprising a signal corresponding to the transmitted access preamble, ceasing preamble transmission, and spread-spectrum transmitting the packet data from the remote station.

12. The base-band processor as in claim 11, further comprising:

an encoder, for encoding data; and an interleaver, coupled to the encoder, for interleaving encoded data and supplying the interleaved data to the multiplexer for multiplexing with the access preamble signals.

13. A base-band processor for use in a wireless remote station for communication of data, the remote station having a spread-spectrum modulator and a spread-spectrum demodulator, the base-band processor comprising:

an acknowledgement detector, coupled to the demodulator, for detecting an acknowledgment in a received spread-spectrum signal;

a preamble generator for generating access preamble signals;

a multiplexer for multiplexing the data and the access preamble signals and supplying the multiplexed data and access preamble signals to the modulator for transmission;

an encoder, for encoding data;

an interleaver, coupled to the encoder, for interleaving encoded data and supplying the interleaved data to the multiplexer for multiplexing with the access preamble signals;

a packet formatter, coupled to the multiplexer, for formatting the multiplexed data and access preamble signals into one or more packets and supplying the one or more packets to the modulator; and a controller coupled to the acknowledgement detector and coupled for controlling the modulator, the preamble generator and the multiplexer, such that in operation the remote station performs the following steps:

(a) spreading an access preamble selected from a set of predefined preambles associated with the base station;

(b) transmitting from the remote station an access-burst signal, the access-burst signal comprising a plurality of segments having a plurality of constant power levels, each segment comprising the spread selected access preamble;

(c) if the number of transmitted access preambles has reached a maximum allowed number of preambles Mp without detecting an acknowledgement comprising a signal corresponding to the transmitted access preamble, ceasing preamble transmission; and (d) upon detecting an acknowledgement comprising a signal corresponding to the transmitted access preamble, ceasing preamble transmission, and spread-spectrum transmitting the packet data from the remote station.

14. A method of sending data from a remote station to at least one of a plurality of base stations in a spread-spectrum wireless communication network, comprising:

receiving from a first base station, a first broadcast common-synchronization channel having a first common chip-sequence signal common to a plurality of remote stations;

receiving from a second base station, a second broadcast common-synchronization channel having a second common chip-sequence signal common to a plurality of remote stations;

determining to transmit to the first base station, based on any of power levels and probabilities of error, from the first and second broadcast common-synchronization channels;

transmitting a first access-burst signal to the first base station, the first access-burst signal comprising a plurality of segments having sequentially increasing discrete power levels, each segment comprising an access preamble;

if the number of transmitted access preambles has reached a maximum allowed number of preambles Mp without detecting an acknowledgement signal, ceasing access-burst transmission; and upon receiving and detecting a first acknowledgment signal corresponding to a transmitted access preamble, from the first base station, ceasing access-burst transmission and transmitting a first spread-spectrum signal having data to the first base station.

15. The method as in claim 14, wherein the plurality of segments of the first access-burst signal have sequentially increasing discrete power levels.

16. The system as in claim 15, wherein:

the first access burst signal comprises a preamble code selected from among a plurality of preamble codes allocated to the first base station;

the step of transmitting the first access-burst signal comprises spreading the selected preamble code; and the first acknowledgment signal corresponds to the selected preamble code.

17. The method as in claim 14, further comprising receiving data or power control information from the first base station.

18. The method as in claim 14, further comprising:
determining to transmit to the second base station, based on any of power levels and probabilities of error, front the first and second broadcast common-synchronization channels;
transmitting a second access-burst signal to the second base station, the second access-burst signal comprising a plurality of segments having sequentially increasing discrete power levels, each segment comprising an access preamble;
if the number of transmissions of an access preamble to the second base station has reached a maximum allowed number of preambles Mp without detecting an acknowledgement signal, ceasing access-burst transmission; and
upon receiving and detecting a second acknowledgement signal from the second base station, the second acknowledgment signal corresponding to the an access preamble transmitted to the second base station, ceasing access-burst transmission and transmitting a second spread-spectrum signal having data to the second base station.

19. The method as in claim 18, wherein the plurality of segments at the second access burst signal have sequentially increasing discrete power levels.

20. The method as in claim 18, wherein:
the second access burst signal comprises a preamble code selected from among a plurality of preamble codes allocated to the second base station;
the step of transmitting the second access-burst signal comprises spreading the preamble code selected from among the preamble codes allocated to the second base station; and
the second acknowledgment signal corresponds to the preamble code selected from among the preamble codes allocated to the second base station.

21. The method as in claim 18, further comprising receiving data or power control information from the second base station.

22. The method of claim 18, wherein the acknowledgement is a level 1 acknowledgement.

23. The method fo claim 18, wherein the power level of the pilot signal is less than the power level of the preamble.

24. The method of claim 14, wherein the acknowledgement is a level 1 acknowledgement.

25. The method of claim 14, wherein the power level of the pilot signal is less than the power level of the preamble.

26. A remote station for wireless communication with a base station of a network, the remote station comprising:
a spread-spectrum transmitter;
a spread-spectrum receiver; and
a controller coupled to the receiver for responding to signals received via the receiver and coupled for controlling the transmitter, such that in operation the remote station is for performing the following steps:
(a) receiving from a first base station, a first broadcast common-synchronization channel having a first common chip-sequence signal common to a plurality of remote stations;
(b) receiving from a second base station, a second broadcast common-synchronization channel having a second common chip-sequence signal common to a plurality of remote stations;
(c) determining to transmit to the first base station, based on any of power levels and probabilities of error, front the first and second broadcast common-synchronization channels;
(d) transmitting an access-burst signal to the first base station comprising a plurality of segments with sequentially increasing discrete power levels, each segment comprising an access preamble;
(e) if the number of transmitted access preambles has reached a maximum allowed number of preambles Mp without detecting an acknowledgement signal, ceasing access-burst signal transmission; and
(f) upon receiving and detecting an acknowledgment signal corresponding to a transmitted access preamble, from the first base station, ceasing transmission of the access-burst signal and transmitting a first spread-spectrum signal having data to the first base station.

27. The remote station as in claim 26, wherein the spread-spectrum transmitter comprises:
a spreading sequence generator;
a product device coupled to an output of the spreading sequence generator and coupled to receive an access preamble and the packet data; and
a digital to analog convener responsive to an output of the product device.

28. The remote station as in claim 26, wherein the spread-spectrum receiver comprises:
an analog to digital converter responsive to a signal received by the remote station; and
a programmable matched filter responsive to an output of the analog in digital converter.

29. A base-band processor, for use in a wireless remote station for communication of data, the remote station having a spread-spectrum modulator and a spread-spectrum demodulator, the base-band processor comprising:
an acknowledgment detector, coupled to the demodulator, for detecting an acknowledgement in a received spread-spectrum signal;
a preamble generator for generating access preamble signals;
a multiplexer for multiplexing the data and the access preamble signals and supplying the multiplexed data and access preamble signals to the modulator for transmission; and
a controller coupled to the acknowledgment detector and coupled for controlling the modulator, the preamble generator and the multiplexer, such that in operation the remote station performs the following steps:
(a) receiving from a first base station, a first broadcast common-synchronization channel having a first common chip-sequence signal common to a plurality of remote stations;
(b) receiving from a second base station, a second broadcast common-synchronization channel having a second common chip-sequence signal common to a plurality of remote stations;
(c) determining to transmit to the first base station, based on any of power levels and probabilities of error, from the first and second broadcast common-synchronization channels;
(d) transmitting an access-burst signal to the first base station comprising a plurality of segments with sequentially increasing discrete power levels, each segment comprising an access preamble;
(e) if the number of transmitted access preambles has reached a maximum allowed number of preambles Mp without detecting an acknowledgement signal, ceasing access-burst signal transmission; and
(f) upon receiving and detecting an acknowledgement signal corresponding to a transmitted access preamble, from the first base station, ceasing transmission of the access-burst signal and transmitting a spread-spectrum signal having data to the first base station.

30. The base-band processor as in claim 29, further comprising:
an encoder, for encoding data; and
an interleaver, coupled to the encoder, for interleaving encoded data and supplying the interleaved data to the multiplexer for multiplexing with the access preamble signals.

31. A base-band processor, for use in a wireless remote station for communication of data, the remote station having a spread-spectrum modulator and a spread-spectrum demodulator, the base-band processor comprising:
an acknowledgement detector, coupled to the demodulator, for detecting an acknowledgement in a received spread-spectrum signal;
a preamble generator for generating access preamble signals;
a multiplexer for multiplexing the data and the access preamble signals and supplying the multiplexed data and access preamble signals to the modulator for transmission;
an encoder, for encoding data;
an interleaver, coupled to the encoder, for interleaving encoded data and supplying the interleaved data to the multiplexer for multiplexing with the access preamble signals;
a packet formatter, coupled to the multiplexer, for formatting the multiplexed data and access preamble signals into one or more packets and supplying the one or more packets to the modulator; and
a controller coupled to the acknowledgement detector and coupled for controlling the modulator, the preamble generator and the multiplexer, such that in operation the remote station performs the following steps:
(a) receiving from a first base station, a first broadcast common-synchronization channel having a first common chip-sequence signal common to a plurality of remote stations;
(b) receiving from a second base station, a second broadcast common-synchronization channel having a second common chip-sequence signal common to a plurality of remote stations;
(c) determining to transmit to the first base station, based on any of power levels and probabilities of error, from the first and second broadcast common-synchronization channels;
(d) transmitting an access-burst signal to the first base station comprising a plurality of segments with a plurality of constant power levels, each segment comprising an access preamble;
(e) if the number of transmitted access preambles has reached a maximum allowed number of preambles Mp without detecting an acknowledgement signal, ceasing access-burst signal transmission; and
(f) upon receiving and detecting an acknowledgement signal corresponding to a transmitted access preamble, from the first base station, ceasing transmission of the access-burst signal and transmitting a spread-spectrum signal having data to the first base station, a packet formatter, coupled to the multiplexer, for formatting the multiplexed data and access preamble signals into one or more packets and supplying the one or more packets to the modulator.

32. A method of sending data from a remote station to at least one of a plurality of base stations in a spread-spectrum wireless communication network, comprising:
receiving from a first base station, a first broadcast common-synchronization channel having a first common chip-sequence signal common to a plurality of remote stations, the first broadcast common-synchronization channel having a first frame-timing signal;
receiving from a second base station, a second broadcast common-synchronization channel having a second common chip-sequence signal common to a plurality of remote stations, the second broadcast common-synchronization channel having a second frame-timing signal;
determining to transmit to the first base station, based on at least one parameter of the received first and second broadcast common-synchronization channels;
spreading an access preamble selected from a set of predefined preambles associated with the first base station;
transmitting an access-burst signal, the access-burst signal having a plurality of segments, each segment comprising a selected access preamble and a pilot signal, the preamble having a sequentially increasing discrete power levels;
if the number of transmissions of the access preamble has reached a maximum allowed number of preambles Mp without detecting an acknowledgement comprising a signal corresponding to the transmitted access preamble, ceasing preamble transmission; and
upon detecting an acknowledgement corresponding to the transmitted access preamble, ceasing preamble transmission and transmitting a first spread-spectrum signal having data, to the first base station.

33. The method as in claim 32, further comprising:
determining to transmit to the second base station, based on any of power levels and probabilities of error, from the first and second broadcast common-synchronization channels;
spreading another access preamble selected from a set of predefined preambles associated with the second base station;
transmitting an access-burst signal, the access-burst signal having a plurality of segments having sequentially increasing discrete power levels, each segment comprising the spread selected access preamble of the second base station and a pilot signal;
if the number of transmissions of the access preamble of the second base station has reached a maximum allowed number of reached a maximum allowed number of preambles Mp without detecting an acknowledgement comprising signal corresponding to the transmitted access preamble of the second base station, ceasing preamble transmission; and
upon detecting an acknowledgement corresponding to the transmitted access preamble of the second base station, ceasing preamble transmission and transmitting a second spread-spectrum signal having data, to the second base station.

34. The method of claim 33, wherein the acknowledgement is a level 1 acknowledgement.

35. the method of claim 33, wherein the power level of the pilot signal is less than the power level of the preamble.

36. A method of sending data from a remote station to at least one of a plurality of base stations in a spread-spectrum wireless communication network, comprising:

receiving from a first base station, a first broadcast common-synchronization channel having a first common chip-sequence signal common to a plurality of remote stations;

receiving from a second base station, a second broadcast common-synchronization channel having a second common chip-sequence signal common to a plurality of remote stations;

determining to transmit to the first base station, based on any of power levels and probabilities of error, from the first and second broadcast common-synchronization channels;

transmitting a first access-burst signal to the first base station, the first access-burst signal comprising a plurality of segments having a plurality of constant power levels, each segment comprising an access preamble and a pilot signal, wherein the power level of each segment is greater than zero;

receiving and detecting a first acknowledgement signal from the first base station corresponding to a transmitted access preamble;

ceasing access-burst transmission; and transmitting a first spread-spectrum signal having data to the first base station.

37. A method of sending data from a remote station to at least one of a plurality of base stations in a spread-spectrum wireless communication network, comprising:

receiving from a first base station, a first broadcast common-synchronization channel having a first common chip-sequence signal common to a plurality of remote stations, the first broadcast common-synchronization channel having a first frame-timing signal;

receiving from a second base station, a second broadcast common-synchronization channel having a second common chip-sequence signal common to a plurality of remote stations, the second broadcast common-synchronization channel having a second frame-timing signal;

determining to transmit to the first base station, based on at least one parameter of the received first and second broadcast common-synchronization channels;

spreading an access preamble selected from a set of predefined preambles associated with the first base station;

transmitting an access-burst signal, the access-burst signal having a plurality of segments having a plurality of constant power levels, each segment comprising the spread selected access preamble and a pilot signal, wherein the power level of each segment is greater than zero;

detecting an acknowledgement from the first base station, the acknowledgement corresponding to the transmitted access preamble;

ceasing preamble transmission; and transmitting a first spread-spectrum signal having data, to the first base station.

38. The method as in claim 37, further comprising:

determining to transmit to the second base station, based on any of power levels and probabilities of error, from the first and second broadcast common-synchronization channels;

spreading another access preamble selected from a set of predefined preambles associated with the second base station;

transmitting an access-burst signal, the access-burst signal having a plurality of segments having a plurality of constant power levels, each segment comprising the spread selected access preamble of the second base station and a pilot signal, wherein the power level of each segment is greater than zero;

detecting an acknowledgement from the second base station, the acknowledgement corresponding to the transmitted access preamble;

ceasing preamble transmission; and transmitting a second spread-spectrum signal having data, to the second base station.

* * * * *

UNITED STATES PATENT AND TRADEMARK OFFICE
CERTIFICATE OF CORRECTION

PATENT NO.         : 7,359,427 B2
APPLICATION NO. : 10/412576
DATED                : April 15, 2008
INVENTOR(S)        : Emmanuel Kanterakis et al.

It is certified that error appears in the above-identified patent and that said Letters Patent is hereby corrected as shown below:

Column 14, line 56 (claim 16), change "16. The system as in claim 15, wherein:" to --16. The method as in claim 15, wherein--.

Signed and Sealed this

Twenty-sixth Day of August, 2008

JON W. DUDAS
*Director of the United States Patent and Trademark Office*